(12) United States Patent
Tomizawa

(10) Patent No.: US 7,773,638 B2
(45) Date of Patent: Aug. 10, 2010

(54) TRANSMISSION DEVICE AND HOME SERVER SYSTEM

(75) Inventor: Kenji Tomizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 329 days.

(21) Appl. No.: 11/947,408

(22) Filed: Nov. 29, 2007

(65) Prior Publication Data

US 2008/0181258 A1 Jul. 31, 2008

(30) Foreign Application Priority Data

Dec. 1, 2006 (JP) ............................. 2006-326230

(51) Int. Cl.
*H04J 3/06* (2006.01)
(52) U.S. Cl. ...................................... 370/517; 370/503
(58) Field of Classification Search ................. 370/503, 370/517
See application file for complete search history.

(56) References Cited

U.S. PATENT DOCUMENTS 6,377,588 B1  4/2002  Osaki

FOREIGN PATENT DOCUMENTS

JP  2000-101560  *  4/2000
JP  2000-151539  *  5/2000

* cited by examiner

*Primary Examiner*—Ricky Ngo
*Assistant Examiner*—Paul Masur
(74) *Attorney, Agent, or Firm*—Turocy & Watson, LLP

(57) ABSTRACT

A transmission device which selects all or a part of streams from among input streams and then transmits the selected streams, and includes a measuring section and an output control signal generating section. The measuring section inputs an output timing reference signal and an output reference clock required in outputting a stream, detects a time when the output timing reference signal indicates the start of output, and predicts a period in which an output transmission clock to be generated is to be paused. The output control signal generating unit N-frequency-divides (N is an integer of 2 or more) an output reference clock, generates an output transmission clock, and outputs an output timing signal having a predetermined phase correlation with an output transmission clock.

21 Claims, 36 Drawing Sheets

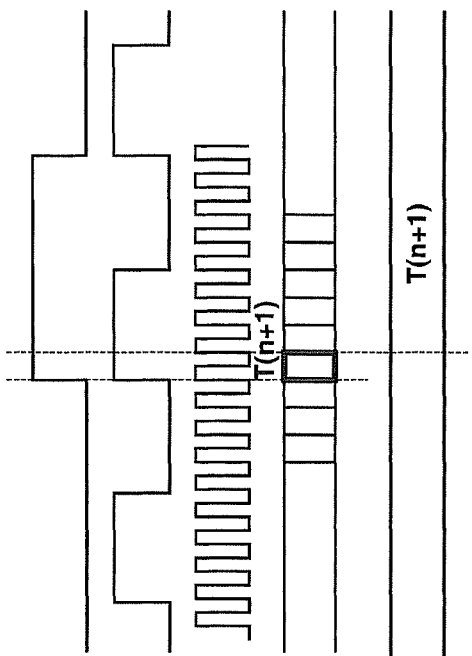

FIG.4A TTSCLK 
FIG.4B TTSCNT2 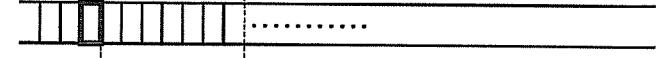
FIG.4C TIME STAMP 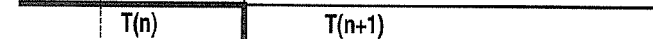
FIG.4D OutputTiming 
FIG.4E SYNCO_base 
FIG.4F SYNCO_fin 
FIG.4G CLKO_base 
FIG.4H DIVCNT1_rst (SYNCO_edge) 
FIG.4I DIVCNT1 
FIG.4J DIVCNT1_eq_N 
FIG.4K CLKSTP_pre 
FIG.4L DIVCNT2_rst 
FIG.4M DIVCNT2 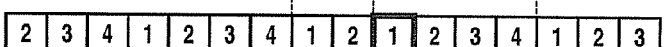
FIG.4N CLKSTP_peri 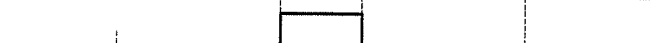
FIG.4O DIVCNT2_eq_N 
FIG.4P DIVCNT2_eq_N/2 
FIG.4Q CLKO 
FIG.4R SYNCO 

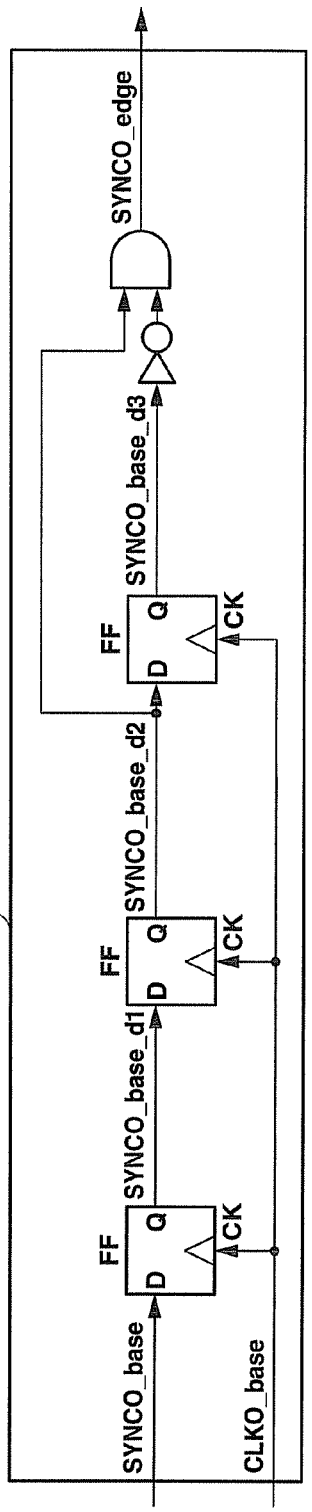
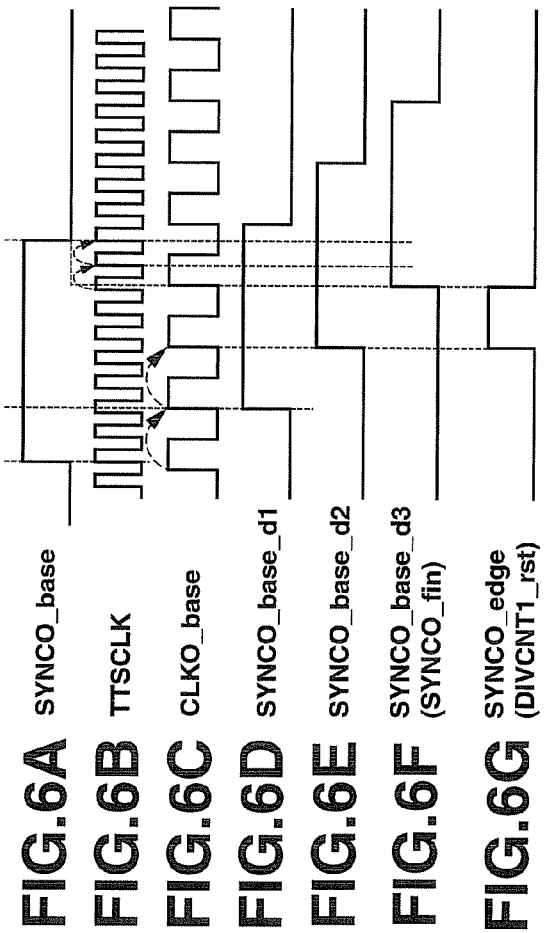
FIG.5
FIG.6A SYNCO_base
FIG.6B TTSCLK
FIG.6C CLKO_base
FIG.6D SYNCO_base_d1
FIG.6E SYNCO_base_d2
FIG.6F SYNCO_base_d3 (SYNCO_fin)
FIG.6G SYNCO_edge (DIVCNT1_rst)

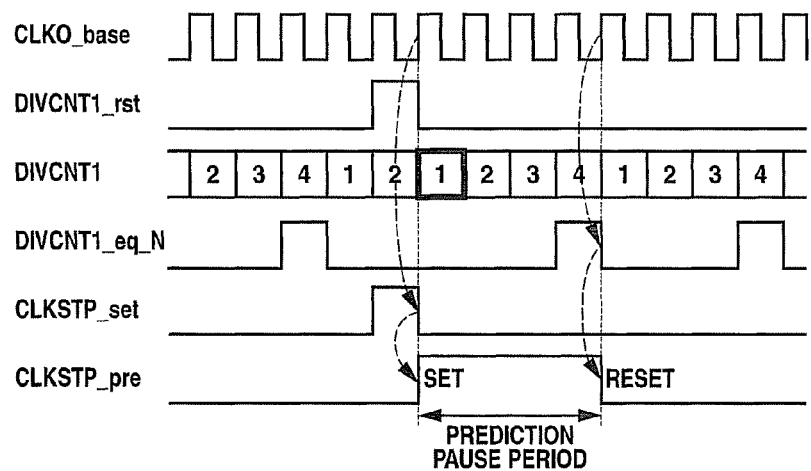
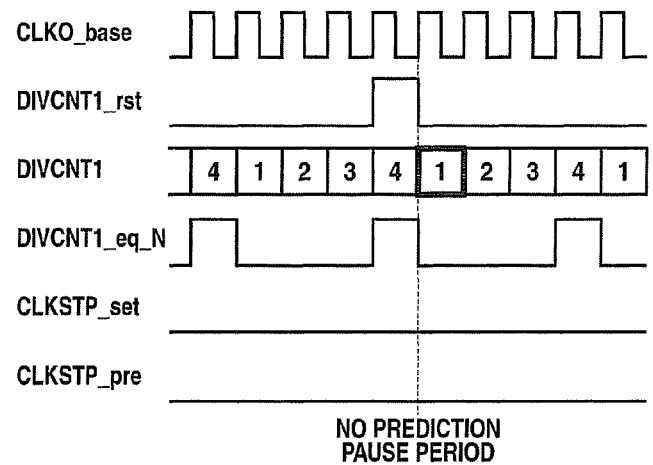

FIG.13
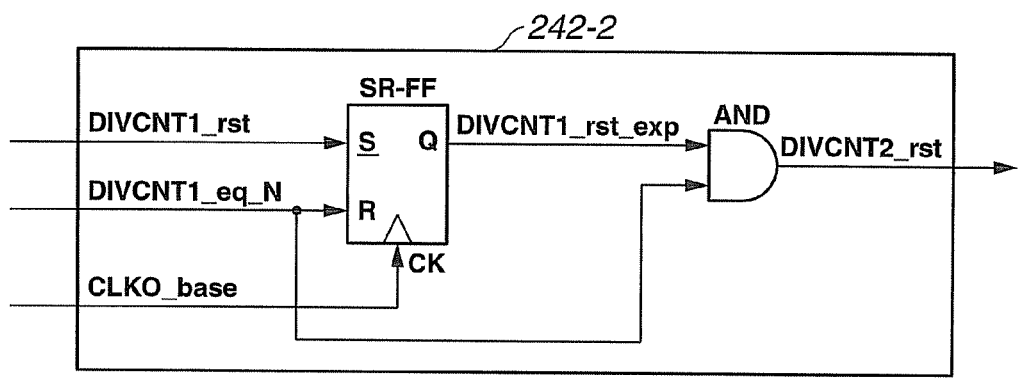
FIG.14A CLKO_base 
FIG.14B DIVCNT1_rst 
FIG.14C DIVCNT1 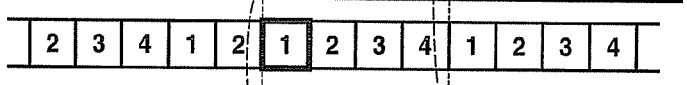
FIG.14D DIVCNT1_eq_N 
FIG.14E DIVCNT1_rst_exp 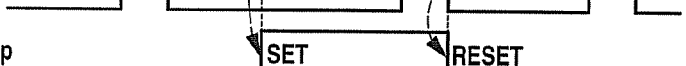
FIG.14F DIVCNT2_rst 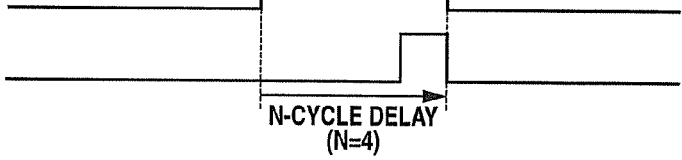

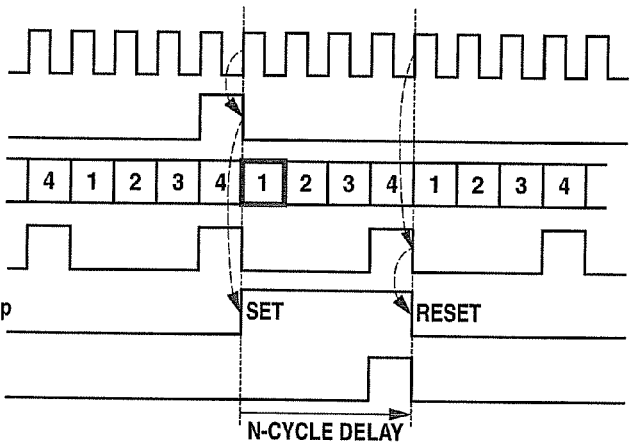
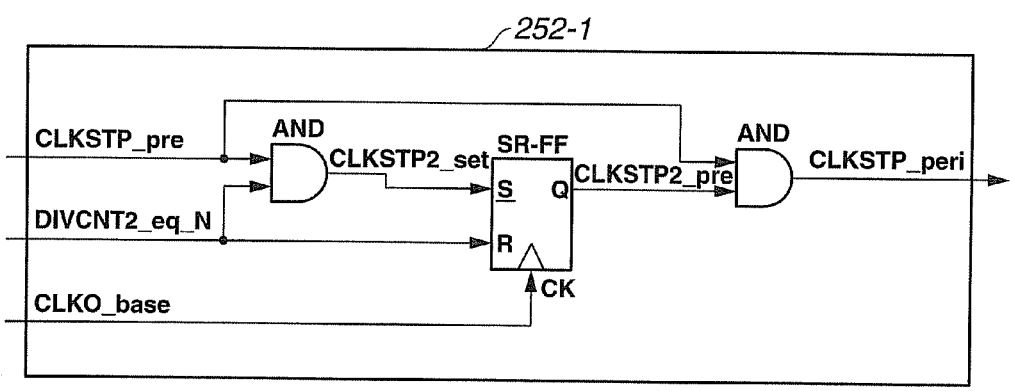
FIG.16

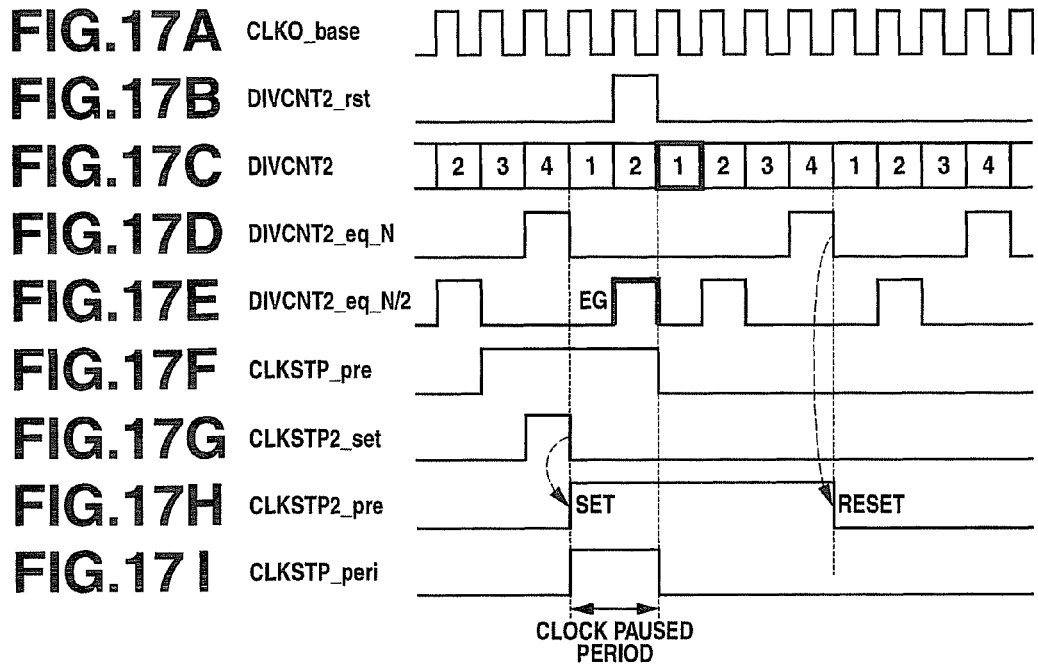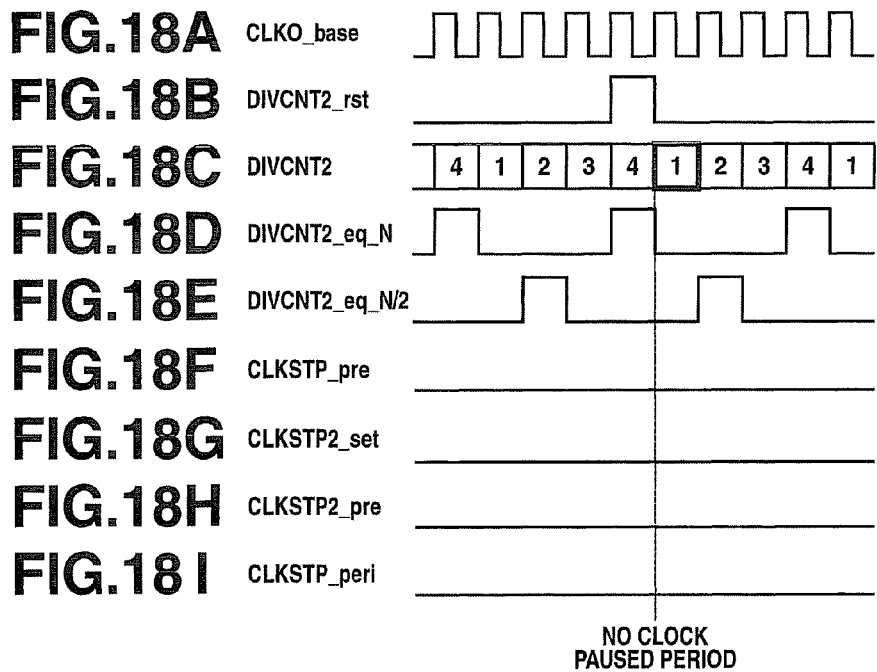

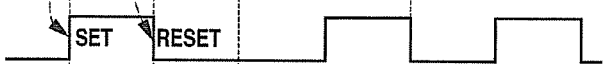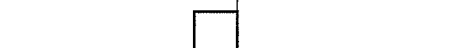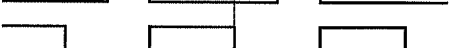

FIG.22
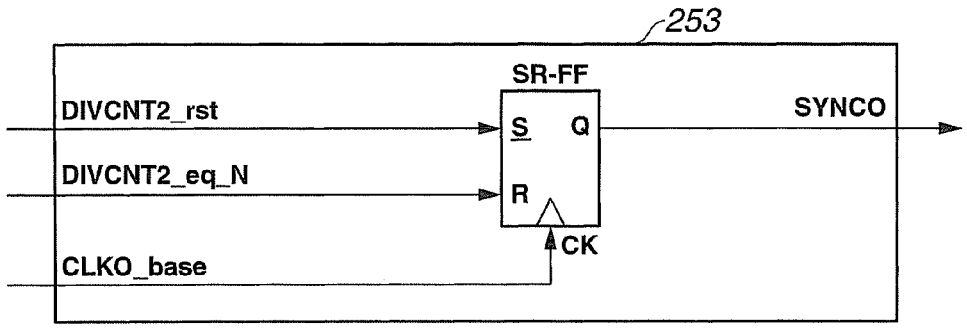
FIG.23A CLKO_base
FIG.23B DIVCNT2_rst
FIG.23C CLKSTP_peri
FIG.23D DIVCNT2_eq_N
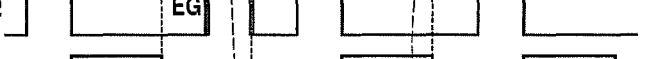
FIG.23E DIVCNT2_eq_N/2
FIG.23F CLKO
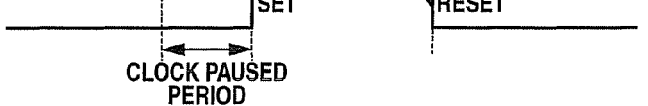
FIG.23G SYNCO
FIG.24A CLKO_base
FIG.24B DIVCNT2_rst
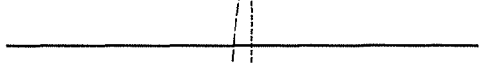
FIG.24C CLKSTP_peri
FIG.24D DIVCNT2_eq_N
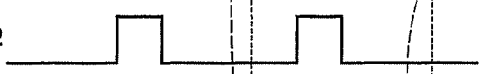
FIG.24E DIVCNT2_eq_N/2
FIG.24F CLKO
FIG.24G SYNCO

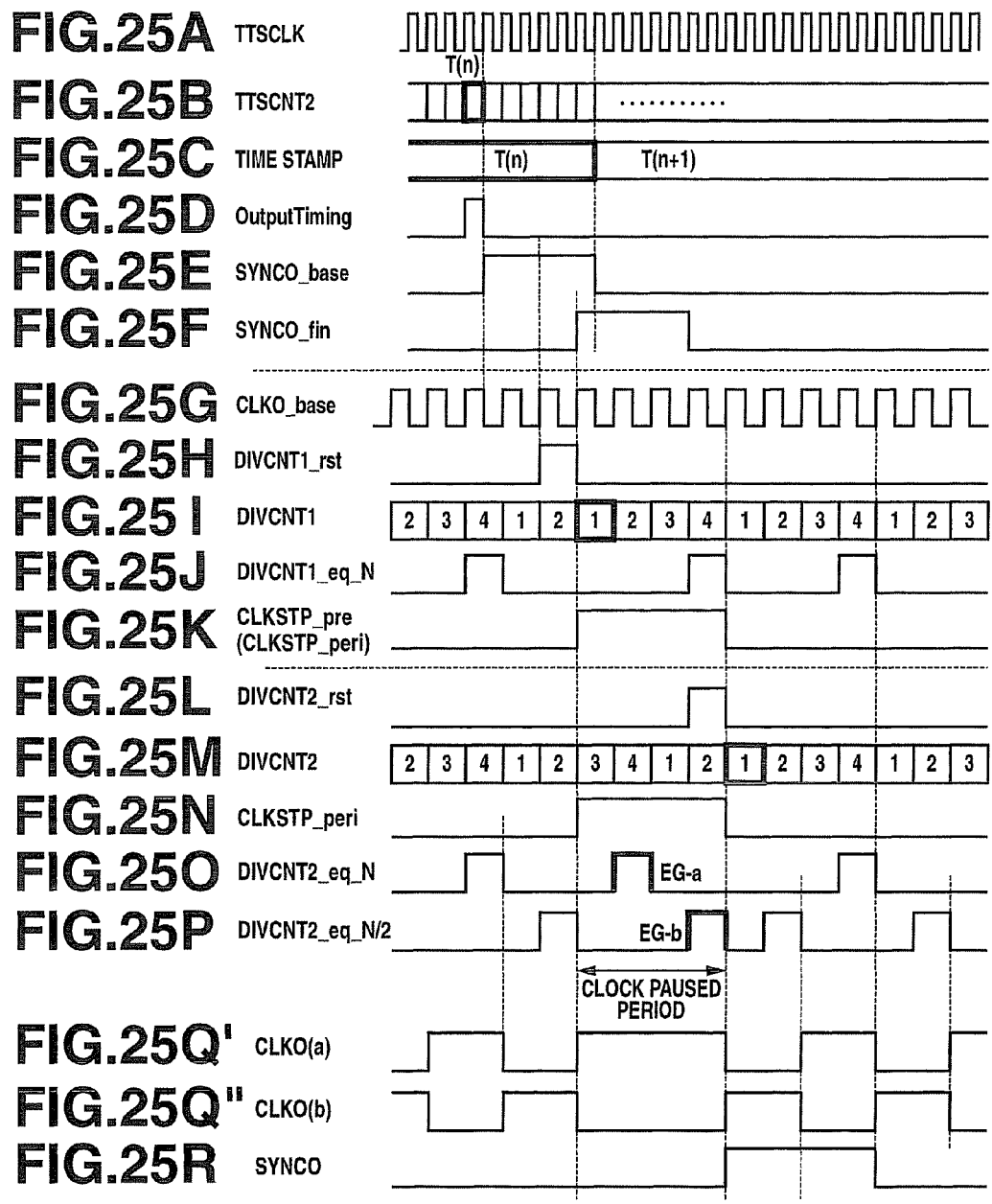

FIG.28A TTSCLK 
FIG.28B TTSCNT2 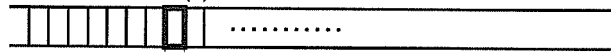
FIG.28C TIME STAMP 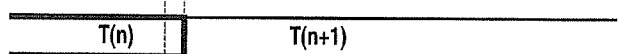
FIG.28D OutputTiming 
FIG.28E SYNCO_base (SYNCO_fin) 
FIG.28G CLKO_base (TTSCLK) 
FIG.28H DIVCNT1_rst 
FIG.28I DIVCNT1 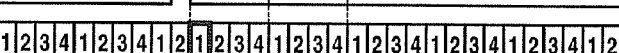
FIG.28J DIVCNT1_eq_N 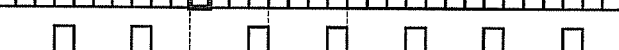
FIG.28K CLKSTP_pre 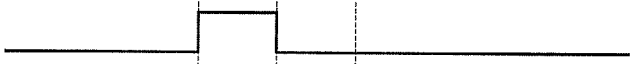
FIG.28L DIVCNT2_rst 
FIG.28M DIVCNT2 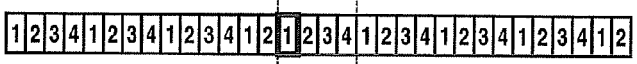
FIG.28N CLKSTP_peri 
FIG.28O DIVCNT2_eq_N 
FIG.28P DIVCNT2_eq_N/2 
FIG.28Q CLKO 
FIG.28R SYNCO 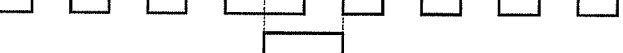

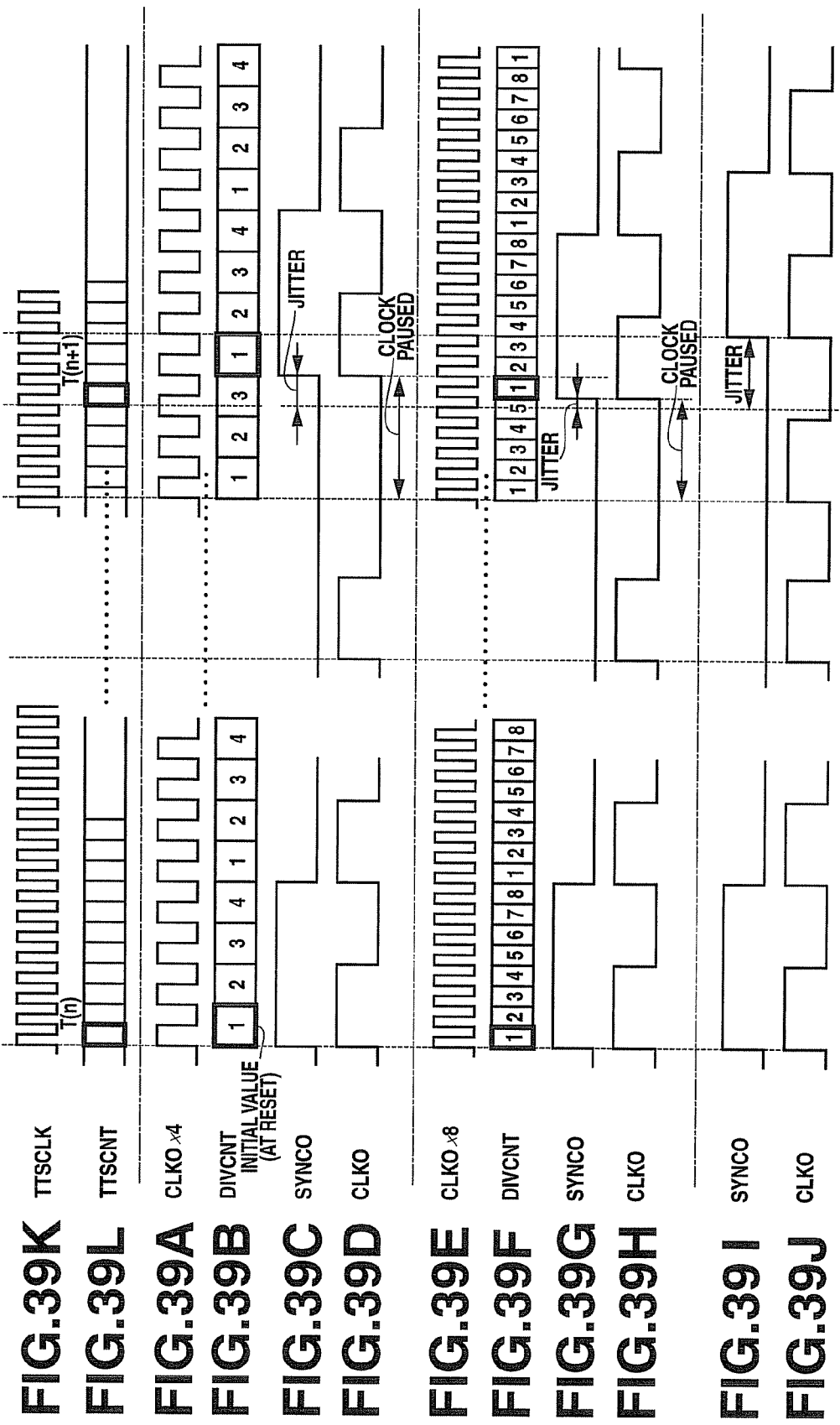

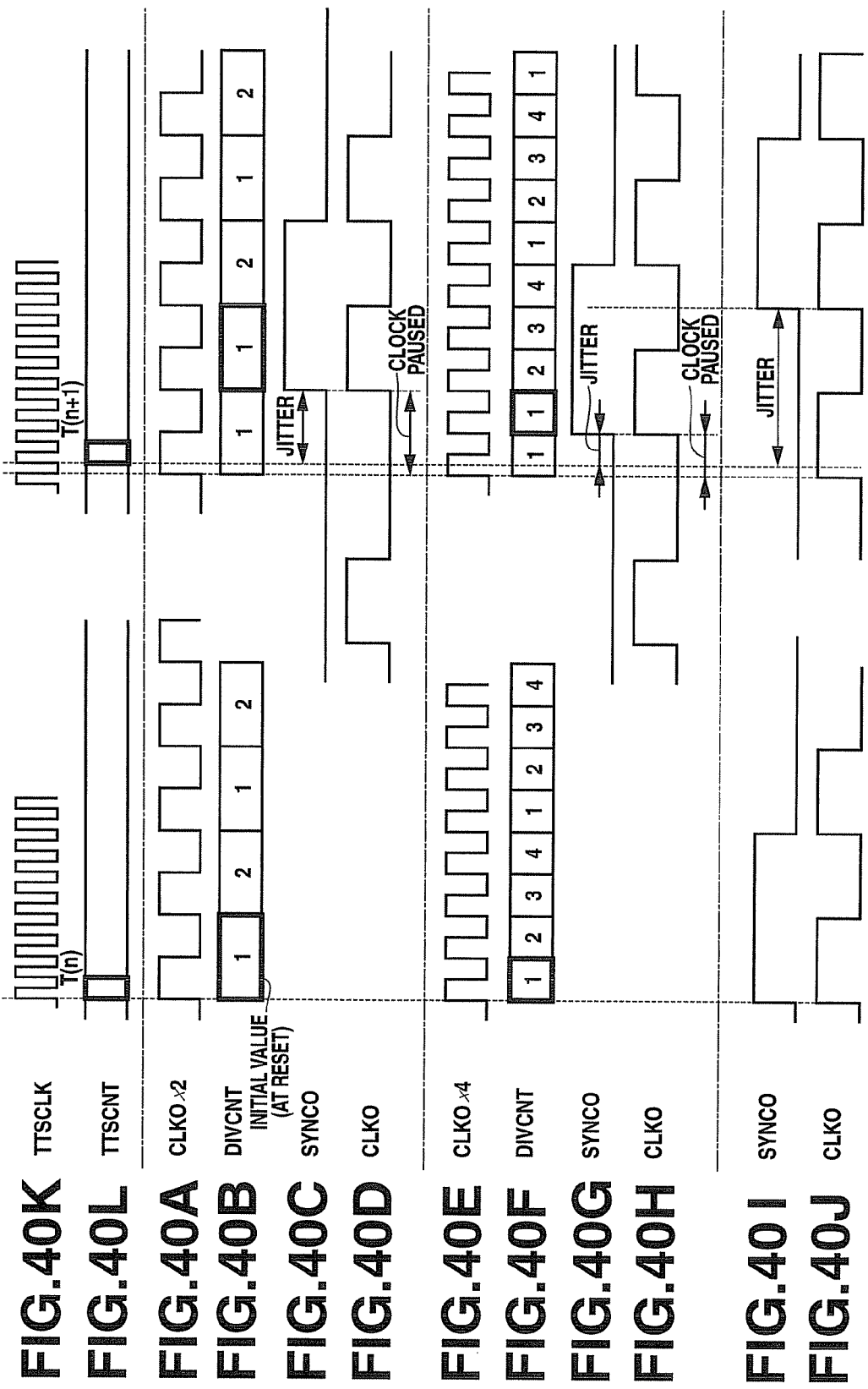

FIG.41A CLK
FIG.41B SYNC
FIG.41C VALID
FIG.41D DATA
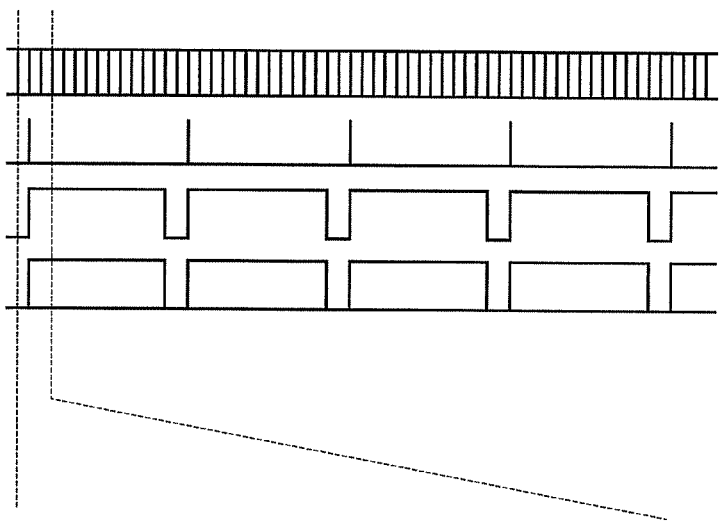
FIG.42A CLK
FIG.42B SYNC
FIG.42C VALID
FIG.42D DATA
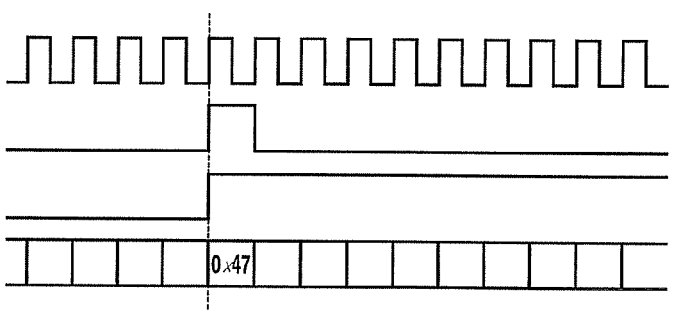
FIG.43A CLK
FIG.43B SYNC
FIG.43C VALID
FIG.43D DATA
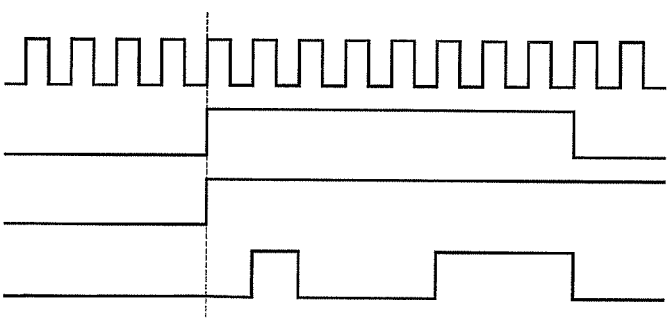

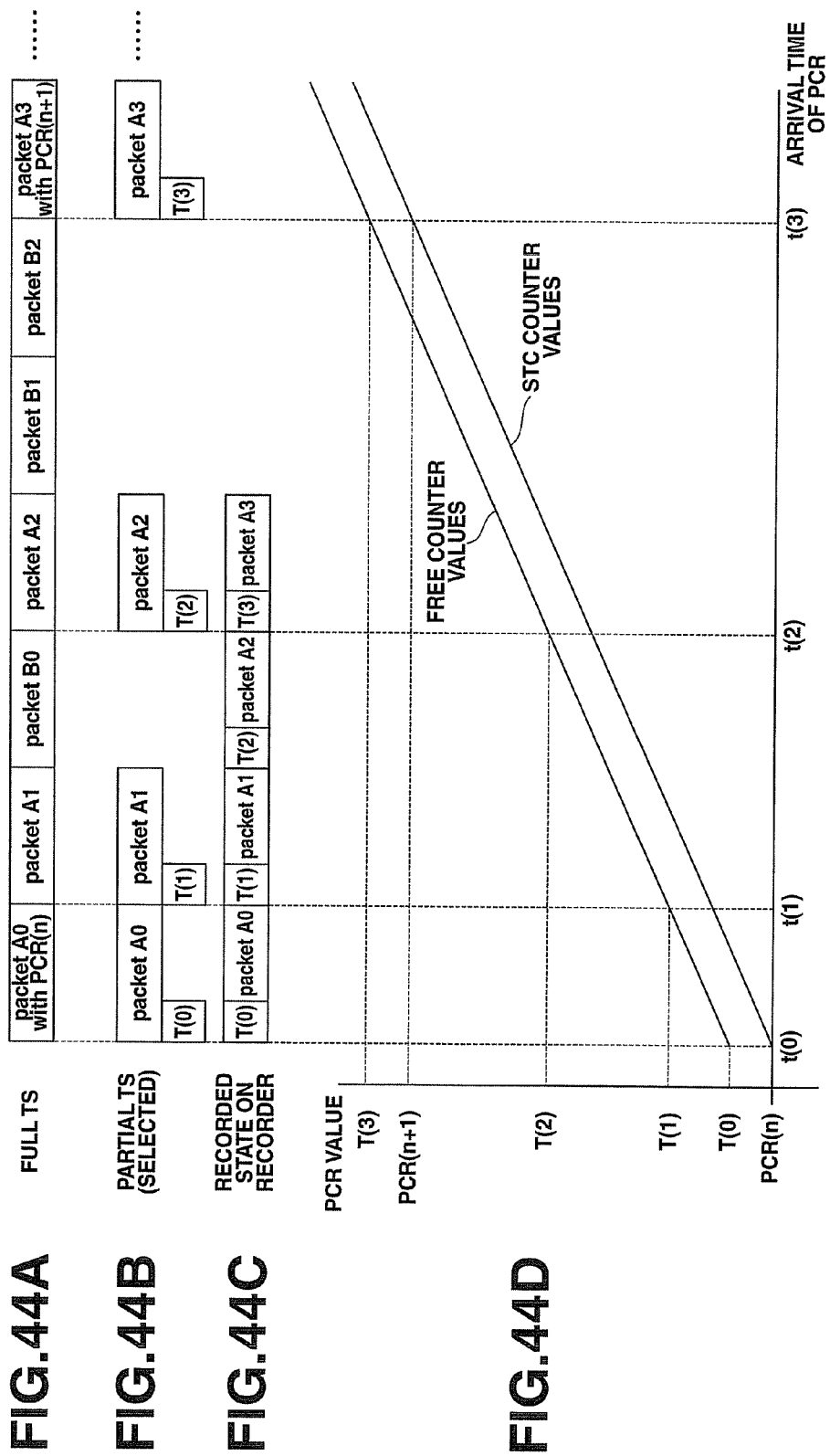

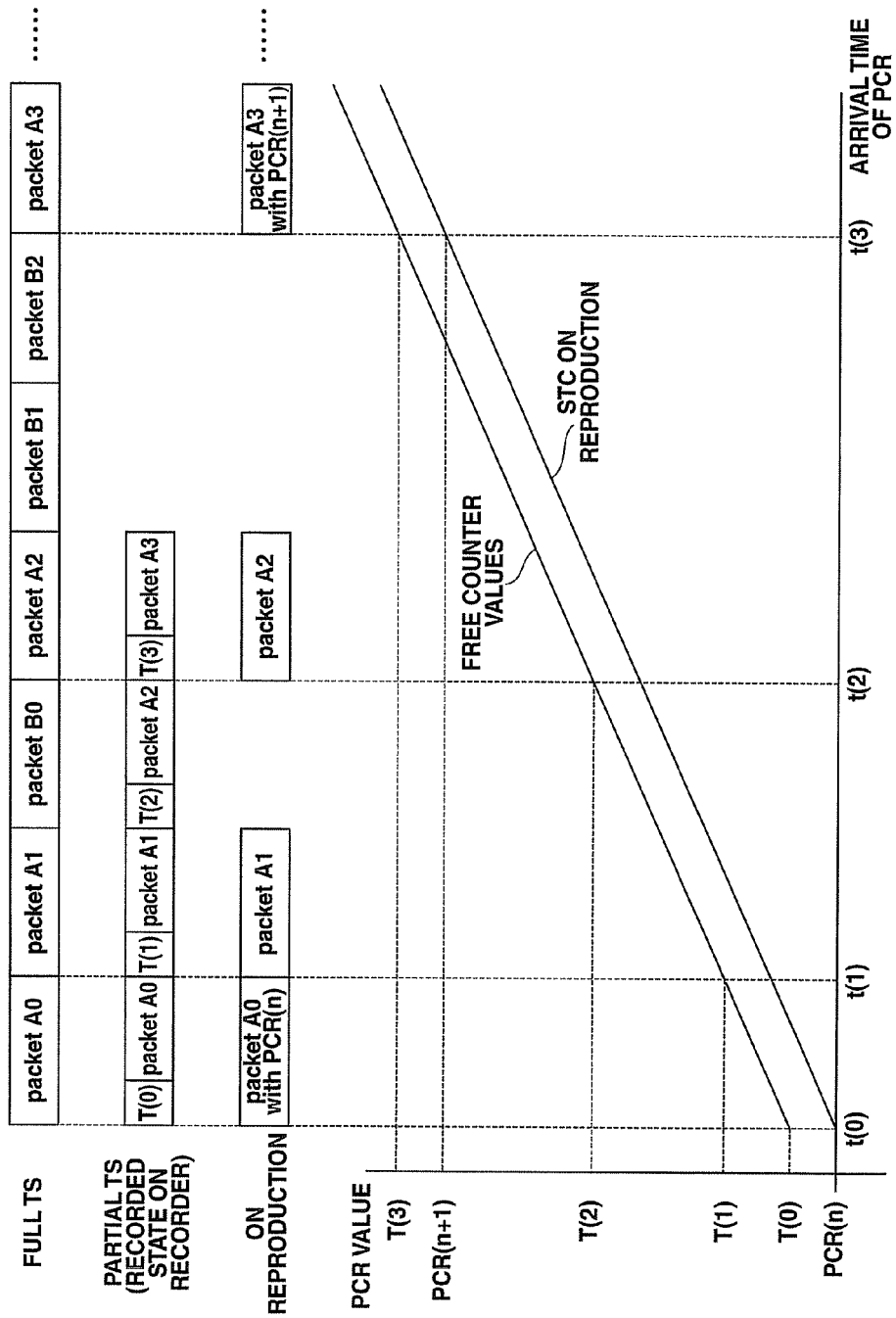

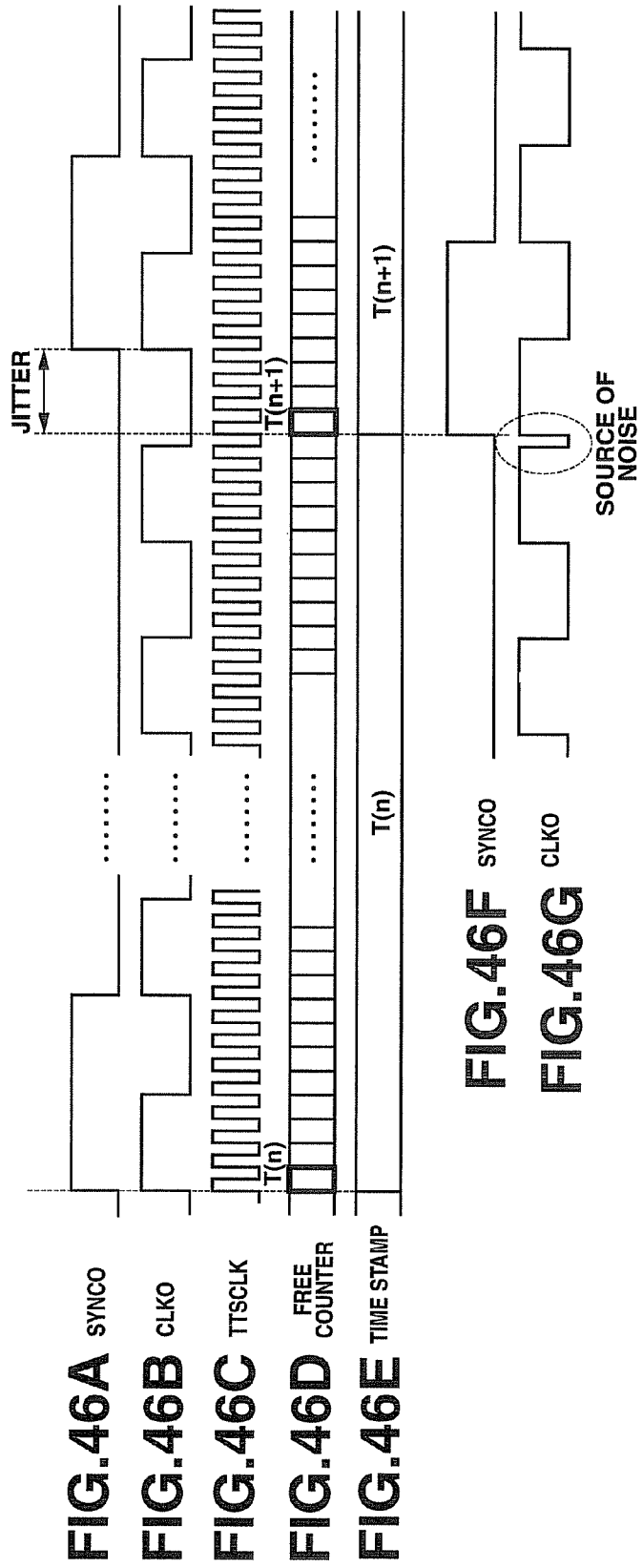

FULL TS

PARTIAL TS (SELECTED)

RECORDED STATE ON RECORDER

ON REPRODUCTION

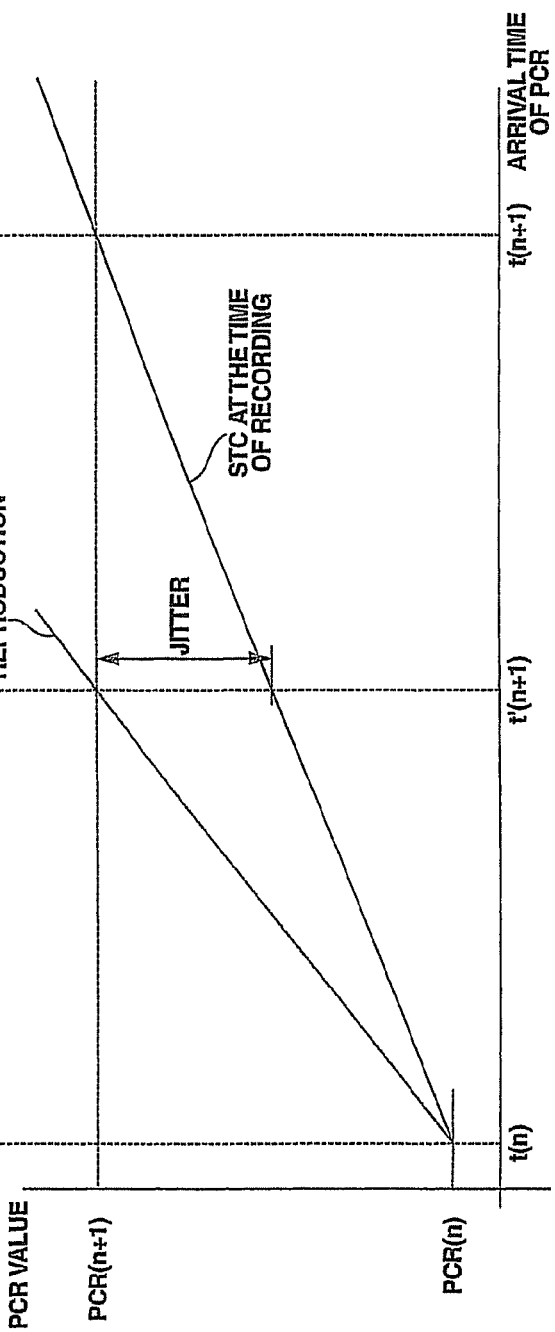

TRANSMISSION DEVICE AND HOME SERVER SYSTEM

CROSS REFERENCE TO RELATED APPLICATION

This application is based upon and claims the benefit of priority from the prior Japanese Patent Application No. 2006-326230 filed on Dec. 1, 2006; the entire contents of which are incorporated herein by this reference.

BACKGROUND OF THE INVENTION

1. Field of the Invention

The present invention relates to a transmission device and a home server system that select all or a part of input streams and transmit the selected streams as new streams, and more specifically to a transmission device and a home server system capable of suppressing the generation of a PCR jitter by a simple circuit component when a digital broadcast stream is received and redistributed.

2. Description of the Related Art

Recently, a digital broadcast stream, for example, there has been a receiving device widespread for recording and regenerating a digital broadcast program without degrading the quality of an image by recording as is a transport stream (hereinafter referred to as TS) of, for example, MPEG2 standards. There is a method of using the receiving device as a home server to receive a program over a network by redistributing the TS to a digital television receiver (hereinafter referred to as digital TV) connected to the network.

The TS is configured by plural packets (hereinafter referred to as a TS packet). When the packets are recorded, only necessary TS packets are normally selected from among received TS packets and recorded. Thus, selecting only necessary TS packets is hereinafter referred to as "partialization", and the selected TS packet group is hereinafter referred to as a "partial TS" etc. The TS before partialization can also be referred to as a "full TS" for convenience.

The TS includes reference time axis information called a PCR (program clock reference), and synchronous reproduction of video and audio can be realized by a receiving device such as a digital TV by decoding compressed data multiplexed on the TS based on the time axis. The PCR is to be multiplexed to the TS packet at least once in 100 ms in accordance with the MPEG2 standards on the transmitting side, but it is not always necessary to multiplex the TS packets at equal time intervals. Therefore, the PCR is transmitted as discrete time information from the transmitting side, and an STC (system target clock) as serial time axis information is reconstructed based on the PCR on the receiving side.

In accordance with the MPEG2 standards, the receiving device is obliged to finely adjust the operation frequency of the STC (in accordance with the MPEG2 standards, an adjustment within at least 27 MHz±810 Hz is required) such that the difference value between the time indicated by the n-th PCR (hereinafter referred to as PCR(n)) and the time indicated by the (n+1)th PCR (hereinafter referred to as PCR(n+1)) can be equal to the difference value between the arrival time of the PCR(n) and the arrival time of the PCR(n+1), thereby eliminating an error between the PCR(n) and the time indicated by the STC (hereinafter referred to as an STC(n)) when the PCR(n) arrives for decoding.

Thus, an error in the time axis direction is called a "jitter", and the time axis reconstructed by the PCR is called a "PCR jitter". In the MPEG2 standards, the tolerance of the PCR jitter is ±500 ns, and the receiving device such as a digital TV etc. is designed based on the accuracy in error. Therefore, when the partial TS is redistributed to another digital TV over a network (IEEE1394, LAN, etc.), it should be considered not to exceed the tolerance of the error.

The partial TS is considered below

As shown in FIGS. 47A to 47D, when a partial TS (refer to FIG. 47B) as a result of selecting the TS packet "packet Ax" (x=0, 1, 2, . . . ) from the full TS (refer to FIG. 47A) is recorded, the partial TS is recorded on a recording medium (DVD (digital versatile disc), BD (Blu-ray disc), a hard disk, etc.) in a state in which the TS packet portion not selected in the full TS is filled (refer to FIG. 47C).

The resultant data is simply reproduced as follows. That is, as shown in FIG. 47D, the relative intervals of the packets A2 and A3 from the recording start TS packet "packet A0" are different from those during recording (when a full TS is input shown in FIG. 47A).

Therefore, as shown in FIG. 48A, if a PCR is multiplexed on the packets A0 and A3 when a full TS is input, the relative interval of the packet A3 from the packet A0 is different from the interval during recording (when a full TS is input as shown in FIG. 48A) in the partial TS during reproduction as shown in FIG. 48B. As a result, as shown in FIG. 48C, the STC reconstructed when a partial TS is reproduced (STC during reproduction) is largely different from the STC reconstructed during recording (STC during recording). That is, the difference between the arrival time of the PCR(n) and the arrival time of the PCR(n+1) is different between the value during recording (t(n+1)−t(n)) and the value during reproduction (t'(n+1)−t(n)), and the PCR jitter violates the value ±500 ns determined in accordance with the MPEG2 standards. In FIG. 48C, the horizontal axis indicates the arrival time of the PCR, and the vertical axis indicates the time (PCR value).

When the MPEG2 standards are violated, the receiving device cannot correctly reconstruct the operation frequency of the STC, thereby causing a defect such as a color error in a video signal, etc. TS packets other than the packets A0 and A3 are reconstructed during reproduction at a transmission rate higher than the input rate during recording, and the STD (system target decoder) buffer of the receiving device overflows, thus causing a problem in which correct reproduction cannot be performed.

Therefore, a method of suppressing the PCR jitter and the overflow during reproduction is proposed and used as recording after assigning the arrival time as a TIME STAMP to each TS packet on the receiving side (for example, the stream object (SOB) format etc. in accordance with the HD DVD standards).

However, the method of recording after assigning a TIME STAMP to a TS packet each time the packet is received on the receiving side enables the PCR jitter and the overflow to be suppressed for each packet, but a PCR jitter of a unit less than a packet cannot be suppressed.

On the other hand, as a prior art, for example, the Japanese Patent Laid-Open No. 2000-151539 discloses a data transmission device for suppressing a PCR jitter within a tolerance using a PLL.

However, there is the problem with the transmission device according to the Japanese Patent Laid-Open No. 2000-151539 that the size of PLL is large and costly parts are used.

SUMMARY OF THE INVENTION

An aspect of the present invention provides a transmission device which selects all or a part of streams from among input streams, and transmits the selected streams as new streams. The transmission device includes: a measuring section configured to input an output timing reference signal and an output reference clock required to output the new streams, and when a notice of output start timing is received according to the output timing reference signal, detect the timing, and predict a period in which an output transmission clock to be generated is to be paused; and an output control signal generating section configured to generate the output transmission clock by frequency-dividing by N (N is an integer of 2 or more) the output reference clock, generate an output timing signal having a constant phase relationship with the output transmission clock, determine at least a part of the period predicted by the measuring section as a paused period, pause generating the output transmission clock during the period, adjust a phase of the output timing reference signal depending on the paused period, and output the signal as the output timing signal.

Another aspect of the present invention provides a transmission device which selects all or a part of streams from among input streams, and transmits the selected streams as new streams. The transmission device includes: a first counter configured to input an output timing reference signal and an output reference clock required to output the new streams, and continuously count a frequency division ratio N (N is an integer of 2 or more) by the output reference clock using output start timing received as a notice according to the output timing reference signal as a starting point; a predicting section configured to, when a notice of output start timing is received according to the output timing reference signal before the first counter completely counts a number corresponding to the frequency division ratio N, detect the timing, and predict a period in which an output transmission clock to be generated is to be paused; a second counter configured to continuously count the frequency division ratio N by the output reference clock with a delay behind the first counter by a time corresponding to one frequency division ratio; a clock generating section configured to generate the output transmission clock as an N frequency dividing clock of the output reference clock by toggles depending on a count value of the second counter, determine at least a part of the period predicted by the predicting section as a paused period, and pause generating the output transmission clock during the period; and a timing generating section configured to generate an output timing signal having a constant phase relationship with the output transmission clock, delay a phase of the output start timing whose notice is received according to the output timing reference signal depending on the paused period whose notice is received from the clock generating section, and output the output timing signal.

A further aspect of the present invention provides a transmission device which selects all or a part of streams from among input streams, and transmits the selected streams as new streams. The transmission device includes: a packet inputting section configured to select all or a part of packets configuring the input streams; an output start timing detecting section configured to detect output start timing of each packet configuring the new streams using a TIME STAMP assigned to each packet of the input streams, and output the TIME STAMP as an output timing reference signal; a measuring section configured to input the output timing reference signal and an output reference clock, and when a notice of output start timing is received according to the output timing reference signal, detect the timing, and predict a period in which an output transmission clock to be generated is to be paused; an output control signal generating section configured to generate the output transmission clock by frequency-dividing by N (N is an integer of 2 or more) the output reference clock, output an output timing signal having a constant phase relationship with the output transmission clock, determine at least a part of the period predicted by the measuring section as a paused period, pause generating the output transmission clock during the period, adjust a phase of the output timing reference signal depending on the paused period, and output the signal as the output timing signal; and a packet outputting section configured to match each packet selected by the packet inputting section with the output timing signal whose phase is adjusted, synchronize the packet to the N-frequency-divided output transmission clock, and output the packets as the new streams.

A further aspect of the present invention provides a transmission device which selects all or a part of streams from among input streams, and transmits the selected streams as new streams. The transmission device includes: a packet inputting section configured to select all or a part of packets configuring the input streams; a measuring section configured to input a packet synchronous signal to be input to the packet inputting section as an output timing reference signal indicating output start timing of each packet configuring the new streams, input an input transmission clock to be input to the packet inputting section as an output reference clock configuring the new streams, and when a notice of output start timing is received according to the output timing reference signal, detect the timing, and predict a period in which an output transmission clock to be generated is to be paused; an output control signal generating section configured to generate the output transmission clock by frequency-dividing by N (N is an integer of 2 or more) the output reference clock, output an output timing signal having a constant phase relationship with the output transmission clock, determine at least a part of the period predicted by the measuring section as a paused period, pause generating the output transmission clock during the period, adjust a phase of the output timing reference signal depending on the paused period, and output the signal as the output timing signal; and a packet outputting section configured to match each packet selected by the packet inputting section with the output timing signal whose phase is adjusted, synchronize the packet to the N-frequency-divided output transmission clock, and output the packets as the new streams.

A further aspect of the present invention provides a transmission device including: a recording medium storing in advance a stream; a packet inputting section configured to input the stream from the recording medium and select a TIME STAMP and a packet from the stream; an output start timing detecting section configured to detect output start timing of each packet configuring the input streams using a TIME STAMP assigned to each packet of the input streams, and output the TIME STAMP as an output timing reference signal; a measuring section configured to input the output timing reference signal and an output reference clock, and when a notice of output start timing is received according to the output timing reference signal, detect the timing, and predict a period in which an output transmission clock to be generated is to be paused; an output control signal generating section configured to generate the output transmission clock by frequency-dividing by N (N is an integer of 2 or more) the output reference clock, output generate an output timing signal having a constant phase relationship with the output transmission clock, determine at least a part of the period predicted by the measuring section as a paused period, pause generating the output transmission clock during the period, adjust a phase of the output timing reference signal depending on the paused period, and output the signal as the output timing signal; and a packet outputting section configured to match each packet selected by the packet inputting section with the output timing signal whose phase is adjusted, synchronize the packet to the N-frequency-divided output transmission clock, and output the packets as streams.

BRIEF DESCRIPTION OF THE DRAWINGS

FIGS. 3A to 3E are timing charts showing the operation timing of generating a TIME STAMP in the packet inputting section;

FIGS. 4A to 4R are timing charts showing the operation timing of the system decoder shown in FIG. 1;

FIG. 5 is a schematic circuit diagram showing an example of the circuit of the resynchronizing section;

FIGS. 6A to 6G are timing charts showing the operation timing of each section shown in FIG. 5;

FIGS. 11A to 11F are timing charts showing the operation timing of a signal of each section shown in FIG. 10 when a prediction paused period is set;

FIGS. 12A to 12F are timing charts showing the operation timing of a signal of each section shown in FIG. 10 when a prediction paused period is not set;

FIG. 13 is a schematic circuit diagram showing an example of the second circuit section of a predicting section;

FIGS. 14A to 14F are timing charts showing the operation timing of each section shown in FIG. 13 when there is a clock paused period;

FIGS. 15A to 15F are timing charts showing the operation timing of each section shown in FIG. 13 when there is no clock paused period;

FIG. 16 is a schematic circuit diagram showing an example of a circuit of the first circuit section of the clock generating section;

FIGS. 17A to 17I are timing charts showing the operation timing of each section shown in FIG. 16 when there is a clock paused period;

FIGS. 18A to 18I are timing charts showing the operation timing of each section shown in FIG. 16 when there is no clock paused period;

FIGS. 20A to 20I are timing charts showing the operation timing of each section shown in FIG. 19 when there is a clock paused period;

FIGS. 21A to 21I are timing charts showing the operation timing of each section shown in FIG. 19 when there is no clock paused period;

FIG. 22 is a schematic circuit diagram showing an example of a circuit of the timing generating section;

FIGS. 23A to 23G are timing charts showing the operation timing of each section shown in FIG. 22 when there is a clock paused period;

FIGS. 24A to 24G are timing charts showing the operation timing of each section shown in FIG. 22 when there is no clock paused period;

FIGS. 25A to 25R are timing charts showing examples in FIG. 2 in which methods of generating an output transmission clock are different from those shown in FIG. 4A to 4R;

FIGS. 28A to 28R are timing charts showing the operation timing of the system decoder shown in FIG. 26;

FIGS. 39A to 39L are timing charts for explanation of the effect of the present invention using a practical example of a frequency division ratio N;

FIGS. 40A to 40L are timing charts for explanation of the effect of the present invention using a practical example of a frequency division ratio N;

FIGS. 41A to 41D are explanatory view of a necessary signal in a TS transmission;

FIGS. 42A to 42D are enlarged views in a clock unit of the header portion of the packets shown in FIGS. 41A to 41D, and the data is transmitted and received according to a parallel signal;

FIGS. 43A to 43D are enlarged views in a clock unit of the header portion of the packets shown in FIGS. 41A to 41D, and the data is transmitted and received according to a serial signal;

FIGS. 44A to 44D are explanatory views of assigning a TIME STAMP during recording;

FIGS. 45A to 45D are explanatory views of using a TIME STAMP during reproduction;

FIGS. 46A to 46G are timing charts for explanation of the problems with the prior art;

FIGS. 48A to 48C are explanatory views for explanation of the problems with the PCR jitter.

DETAILED DESCRIPTION OF THE PREFERRED EMBODIMENTS

The embodiments of the present invention are described below with reference to the attached drawings.

Figure 1:
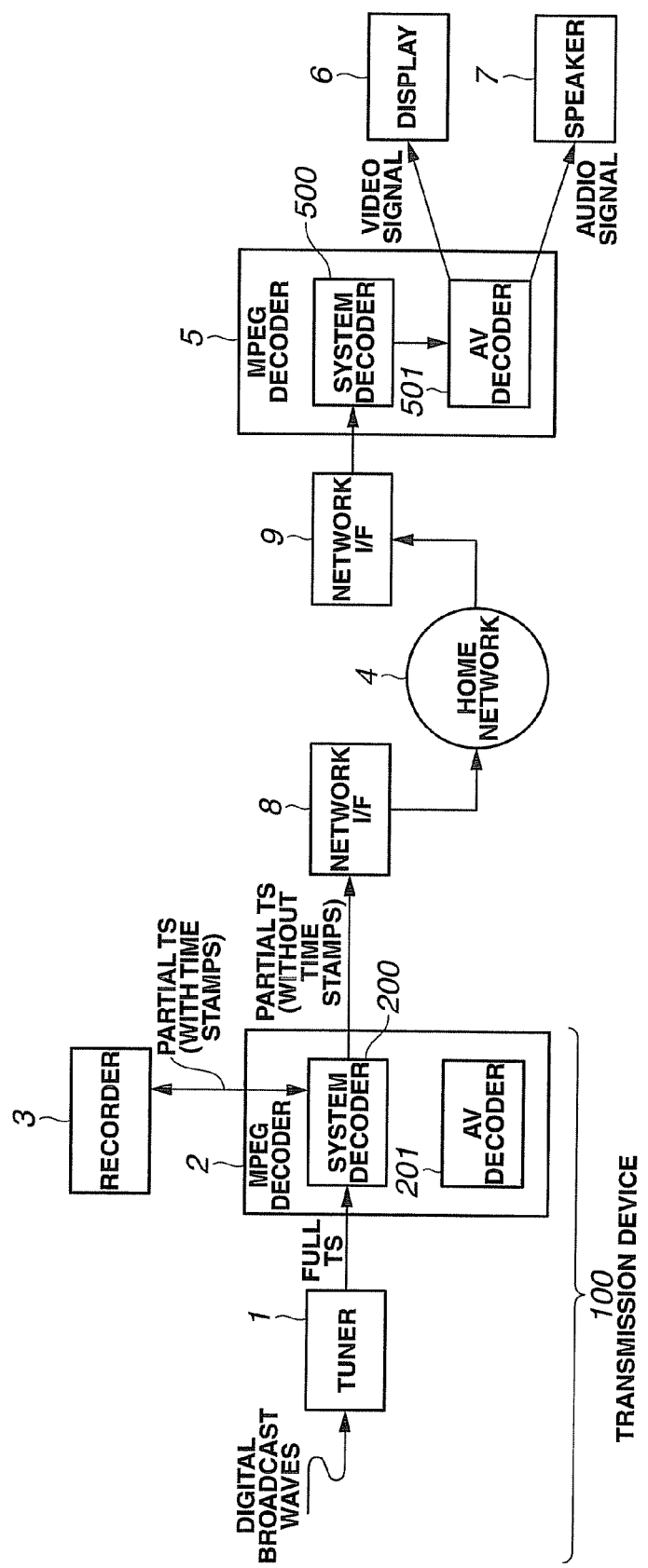
FIG. 1 is a block diagram of the home server system including the transmission device according to the first embodiment to which the present invention is applied.

Before explaining the embodiments of the present invention, the techniques and the problems of the TIME STAMP as the base of the embodiments of the present invention are described below. Considered in these embodiments, for example as shown in FIG. 1, is a transmission device 100 (including at least a tuner 1, an MPEG decoder 2 and a recorder 3) used in a home server system capable of receiving a broadcast program on the digital TV in each room by redistributing a stream read from a recording medium to each room in a home over a home network such as the IEEE1394 etc. using a digital TV, a set top box, a personal computer, etc. capable of temporarily storing a stream of a program to be taken by receiving a digital broadcast stream on a recording medium such as a DVD, BD, hard disk, etc. in a user home in which a digital broadcast program.

When a TS as a digital broadcast stream is transmitted and received by the MPEG decoder 2 in the transmission device 100, a signal shown in FIG. 41 is generally required. FIGS. 41A to 41D show examples of the outline of an input waveform viewed as a packet. FIGS. 42A to 42D and FIGS. 43A to 43D show examples detailed waveforms of the header portion of the packet shown in FIGS. 41A to 41D expanded for each clock. FIGS. 42A to 42D show the case in which DATA shown in FIGS. 41A to 41D is transmitted and received by the 8-bit parallel signal. FIGS. 43A to 43D show the case in which DATA shown in FIGS. 41A to 41D is transmitted and received by the 1-bit serial signal. A CLK shown in FIGS. 41A, 42A, and 43A indicates a transmission clock. A SYNC shown in FIGS. 41B, 42B, and 43B indicates a packet synchronous signal expressing the header of a TS packet. A VALID shown in FIGS. 41C, 42C, and 43C indicates a packet valid signal expressing whether or not DATA is valid. DATA shown in FIGS. 41D, 42D, and 43D indicates a data signal expressing the value for 188 bytes of a TS packet (some tuners and recorders do not require SYNC or VALID).

In a transmission device which receives and redistributes a digital broadcast stream as described above, a method of suppressing a PCR jitter and an overflow when a partial TS is recorded and reproduced is a well-known method of recording and reproducing the partial TS with a TIME STAMP (T(n), n=0, 1, 2, . . . ) assigned to each TS packet.

A practical example using a 32-bit counter (hereinafter referred to as a free counter) counted at 27 MHz is to assign the value of a free counter when the header data of the TS packet reaches (is input to) the MPEG decoder 2 to the header of each TS packet as a TIME STAMP of the TS packet, and record the resultant data as shown in FIGS. 44A to 44D. An STC counter contains a value of a counter for reconstructing an STC in comparison with the value of the recording free counter, and a TIME STAMP is time information having the same inclination as the value of the STC counter. As shown in FIGS. 45A to 45D, the input interval of a TS packet almost correctly selected as a partial TS can be reproduced by reconstructing the arrival time of each TS packet based on the TIME STAMP during reproduction. As a result, the PCR jitter and an overflow can be suppressed.

However, when a countermeasure against the PCR jitter is devised only by assigning a TIME STAMP, there occurs a problem that the PCR jitter during redistribution is to be completely suppressed as described below.

For redistribution, it is necessary to output a packet data with the TS packet synchronized with an output transmission clock (hereinafter referred to as CLKO) using an output timing signal (hereinafter referred to as SYNCO) reproduced based on a TIME STAMP as a start point, but the frequencies of a CLKO and a free counter operation clock (hereinafter referred to as TTSCLK) are not generally the same. Therefore, the count interval by the TTSCLK and the output interval by the CLKO do not match each other in most cases, thus resulting in asynchronous output.

Therefore, as shown in FIGS. 46A to 46E, if the output of TS packets is started at the output start timing T(n) indicated by the TIME STAMP of the first TS packet, and the SYNCO of the output timing signal is forcibly made active at the output start timing T(n+1) indicated by the TIME STAMP of the next TS packet as shown in FIG. 46F, then it is necessary to perform a formatting operation of generating a waveform in a fine-fiber-shaped pulse on the CLKO of the output transmission clock immediately before the output start timing of the next TS packet as shown in FIG. 46G. However, since the formatted waveform can be a noise source having an undesired effect on a destination network I/F 8 and 9, or an MPEG decoder 5 (refer to FIG. 1), the waveform is not to be output. If a SYNCO is synchronized to a CLKO instead of formatting a CLKO, then the jitter for one cycle of a CLKO at maximum can be generated as shown in FIGS. 46A and 46B. FIGS. 46A to 46G show an example of generating about half cycle of jitter. One cycle refers to a time interval corresponding to one period of a target clock.

If the jitter occurs at the output start timing of the TS packet on which the PCR is multiplexed, then the jitter is transmitted to PCR jitter.

The following embodiments can provide a transmission device capable of reducing the PCR jitter for smaller than a packet unit as shown in FIGS. 46A to 46G that cannot be solved by assigning a TIME STAMP.

First Embodiment

FIG. 1 is a block diagram of the home server system including the transmission device according to the first embodiment of the present invention.

The home server system shown in FIG. 1 includes: a tuner 1 configured to receive digital broadcast waves and reconstruct a stream as a full TS; an MPEG decoder 2 including at least a system decoder 200 which inputs and outputs all or a part of full TS or a partial TS as a new partial TS; a recorder 3 configured to record a partial TS; a network interface 8 configured to transmit the partial TS output from the system decoder 200 to a home network 4; a network interface 9 configured to receive and output the partial TS from the home network 4; an MPEG decoder 5 including a system decoder 500 which receives the partial TS output from the network interface 9 and an AV decoder 501 which decodes the partial TS; a display 6 configured to display the decoded video signal as video; and a speaker 7 configured to output the decoded audio signal as audio. The portion including the tuner 1, the MPEG decoder 2, and the recorder 3 configure the transmission device 100.

The digital broadcast waves are input to the tuner 1 by way of an antenna or a cable omitted in the attached drawings.

A recording medium (hard disk, DVD, memory, and etc.) not shown in the attached drawings is connected to the recorder 3 which records a stream (partial TS).

The MPEG decoders 2 and 5 can be a device having the same configuration including a system decoder and an AV decoder. That is, as shown in FIG. 1, the MPEG decoder 2 can include an AV decoder 201. In this case, in the first embodiment, the MPEG decoder 2 distributes a partial TS to the home network 4 by mainly using the system decoder 200, and the MPEG decoder 5 decodes a video signal and an audio signal (hereinafter referred to AV data) mainly using the AV decoder 501.

In the embodiment, the home server system applies an operation referred to as a "time shift" to a network distribution. A time shift refers to taking a broadcast program with a predetermined time difference. Depending on the time difference, a recording medium (hard disk, DVD, memory, and etc.) for accumulating the stream for the time is required.

In the transmission device 100 described above, the circuit to which the present embodiment is applied is the system decoder 200, and the system decoder 200 is mainly described below.

Figure 2:
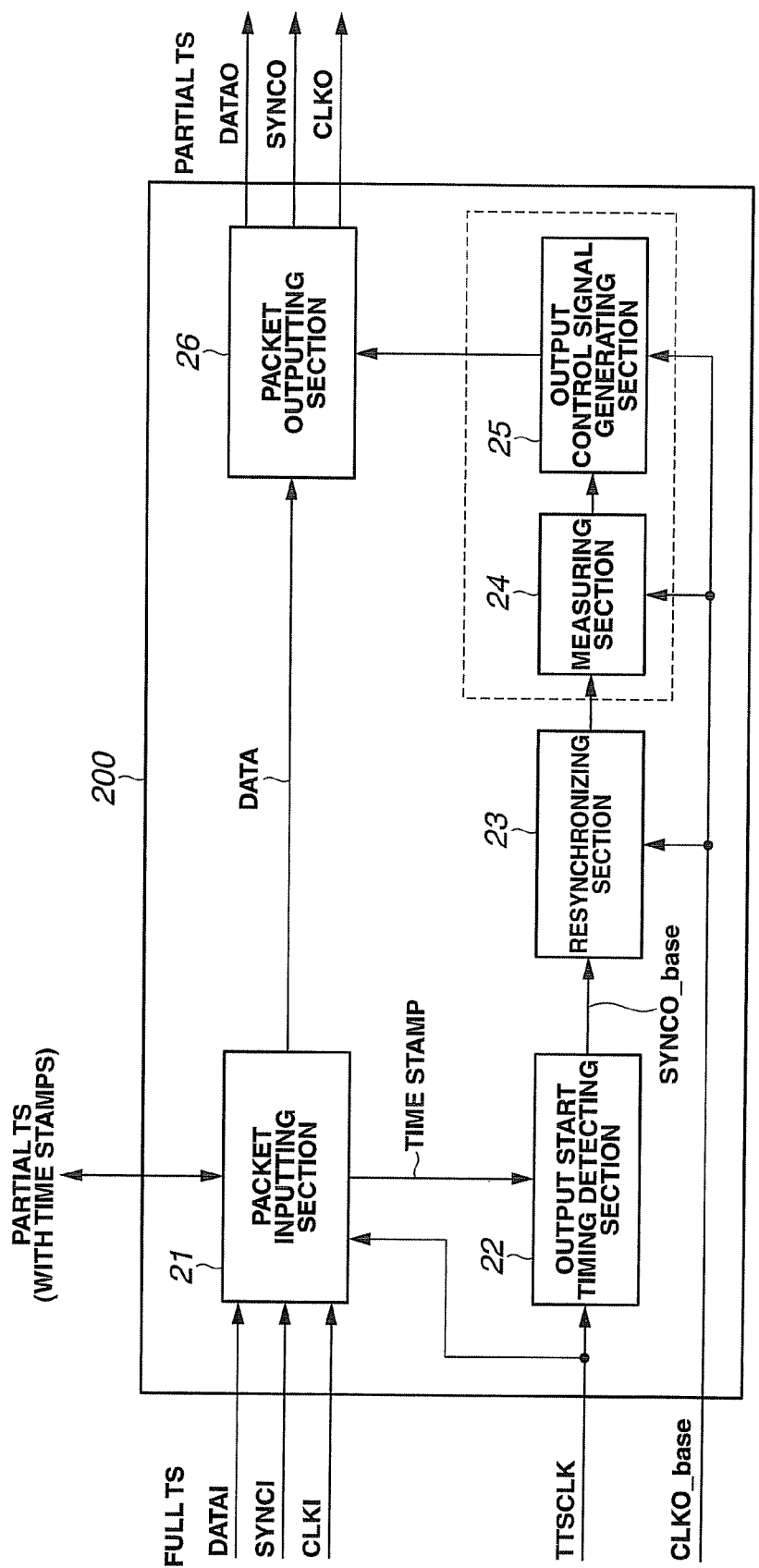
FIG. 2 is a block diagram of the system decoder shown in FIG. 1.

FIG. 2 shows the configuration of the system decoder 200 according to the first embodiment.

In FIG. 2, the system decoder 200 includes: a packet inputting section 21 configured to assign a TIME STAMP to a full TS from the tuner 1, select only a TS packet required to take a program, transmit the packet as a partial TS with a TIME STAMP to the recorder 3, and select a TIME STAMP and a partial TS with respect to the partial TS with a TIME STAMP read from the recorder 3 after a desired time period; an output start timing detecting section 22 configured to detect output start timing from the TIME STAMP, and send (output) a notice of the timing as an output timing reference signal (SYNCO_base), a resynchronizing section 23 configured to synchronize the output timing reference signal to an output reference clock (CLKO_base); a measuring section 24 configured to measure a period in which an output transmission clock is to be paused using the resynchronized transmission signal as a start point; an output control signal generating section 25 configured to generate an output transmission clock and an output timing signal; and a packet outputting section 26 configured to output the partial TS from the packet inputting section 21 according to the output transmission clock and the output timing signal.

First, the packet inputting section 21 of the system decoder 200 shown in FIG. 2 is described.

The packet inputting section 21 contains a first TIME STAMP counter operating with a TIME STAMP clock (TTSCLK). Each time each TS packet configuring a full TS arrives from the tuner 1, the value of the first TIME STAMP counter (TTSCNT1) on arrival is assigned as a TIME STAMP to each TS packet. The first TIME STAMP counter continues counting in a period from the value for example, 0 at which the system decoder 200 is activated to 27 MHz. When the count value is the maximum value, the counter continues counting from 0 in the next period.

FIGS. 3A to 3E show the operation timing of the packet inputting section 21 assigning a TIME STAMP.

The SYNC1 shown in FIG. 3A indicates a packet synchronous signal to be input to the packet inputting section 21. The CLK1 shown in FIG. 3B indicates a transmission clock. The TTSCLK shown in FIG. 3C indicates a TIME STAMP clock. The TTSCLK1 in FIG. 3D indicates a value of the first TIME STAMP counter in the packet inputting section 21. The TIME STAMP shown in FIG. 3E indicates a TIME STAMP.

In transmitting a full TS, the data signal (DATA 1), the transmission clock (CLK1) are inputted from at least the tuner 1 to the packet inputting section 21, but the packet synchronous signal (SYNC1) and the packet valid signal (VALID1) are input as necessary. In accordance with the MPEG2 standards, the value of the leading data of the TS packet is determined as 0×47 ("0×" is a prefix indicating the subsequent value is a hexadecimal value), and the data length of one TS packet is fixed to 188 bytes. Therefore, when a packet synchronous signal is not input from the tuner 1, the TS packet head is to be determined in the MPEG decoder 2 using the cyclicity of 0×47. Furthermore, when a packet valid signal is not input from the tuner 1, the continuous 188-byte data from the packet head is to be valid data of each TS packet. In the present embodiment, a packet synchronous signal (SYNC1) is shown as input from the tuner 1, and the packet valid signal (VALID1) is omitted in the attached drawings.

That is, in the packet inputting section 21, the value (T(n), n=0, 1, 2, ...) of the first TIME STAMP counter when the packet synchronous signal (SYNC1) indicating the header of a TS packet is input (or becomes active) is assigned as a TIME STAMP to the TS packet, and the partial TS that has been partialized in the state in which a TIME STAMP is assigned to the data of each TS packet is output as a partial TS with a TIME STAMP to the recorder 3.

The recorder 3 temporarily stores a partial TS with a TIME STAMP in a recording medium. In the time shifting operation, the partial TS with a TIME STAMP stored in the recorder 3 is output to the packet inputting section 21 again at a time difference (that is, with a time delay) from a broadcast time (time at which the partial TS reaches the system decoder 200 as a full TS from the tuner 1).

The partial TS with a TIME STAMP output from the recorder 3 is sorted by the packet inputting section 21 into a TIME STAMP and TS packet data, and the TIME STAMP is output to the output start timing detecting section 22 and the data is output to the packet outputting section 26.

Second, the output start timing detecting section 22 of the system decoder 200 shown in FIG. 2 is described below.

The output start timing detecting section 22 includes a second TIME STAMP counter operating with a TIME STAMP clock (TTSCLK) similar to the packet inputting section 21, detects the moment when the value (TTSCNT2) of the second TIME STAMP counter is equal to the value of the TIME STAMP as the output start timing of the TS packet assigned the TIME STAMP, and generates the timing as a output timing reference signal (SYNCO_base). When the first TS packet of the partial TS recorded on the recorder 3 is output, the value of the second TIME STAMP counter is initialized to a value indicated by the TIME STAMP assigned to the packet.

The initializing method can be updating the value of the counter and setting the value of the counter as the value of the TIME STAMP counter as is, or separately providing a free counter that continues counting with the TTSCLK repeatedly from 0 to a predetermined value, updating as an offset value a difference value between the counter value and the TIME STAMP value used in initialization, and defining a sum of the free counter value and the offset value as a TIME STAMP counter value. The present invention can be applied to these methods, and does not limit the initializing method. Furthermore, it is also possible to eliminate the necessity to separately provide a free counter by using the first TIME STAMP counter as the free counter.

FIGS. 4A to 4F show the operation timing of generating an output timing reference signal in the output start timing detecting section 22. The TTSCLK shown in FIG. 4A indicates a TIME STAMP clock. The TTSCNT2 shown in FIG. 4B indicates a value of the second TIME STAMP counter. The TIME STAMP shown in FIG. 4C indicates a value of the TIME STAMP input from the packet inputting section 21. The Output Timing shown in FIG. 4D indicates a signal describing the timing of the moment when the TTSCNT2 equals the TIME STAMP value as detected output start timing. The SYNCO_base shown in FIG. 4E indicates an output timing reference signal. The SYNCO_fin shown in FIG. 4F indicates a signal describing the completion of a clock transfer input from the resynchronizing section 23.

In FIGS. 4A to 4F, the timing when the TTSCNT2 is equal to the value of T(n) as the value of the TIME STAMP is detected as output start timing. With the timing the SYNCO_base is synchronous to the TTSCLK, thereby entering an active (high (or 1) level in the figures) state, which holds true in the following descriptions unless otherwise specified. The SYNCO_base enters an inactive level (low (or 0) level in the figures) state unless otherwise specified until the output time (the time when the value of the TIME STAMP assigned to the next TS packet equals the value of the second TIME STAMP counter) of the next TS packet, or until the completion of the output of the current TS packet. In the present embodiment, a signal indicating the completion of the clock transfer is received as SYNCO_fin from the resynchronizing section 23 described later, and the signal is an index of entering the inactive state. The timing of preparing T(n+1) as the value of the next TIME STAMP is similar to the timing of entering the inactive state of the SYNCO_base, and is prepared using the SYNCO_fin as an index in the present embodiment.

Third, the resynchronizing section 23 of the system decoder 200 shown in FIG. 2 is described below.

In the resynchronizing section 23, the resynchronizing process of the output timing reference signal (SYNCO_base) output from the output start timing detecting section 22 to the output reference clock (CLKO_base) is performed.

FIGS. 4G and 4H show the operation timing of the resynchronizing process in the resynchronizing section 23. The CLKO_base shown in FIG. 4G indicates an output reference clock. The SYNCO_edge shown in FIG. 4H indicates the SYNCO_base on which the resynchronizing process has been performed.

The resynchronizing process is required when the TIME STAMP clock (TTSCLK) as an operation clock of the second TIME STAMP counter is asynchronous to the output reference clock (CLKO_base), which is also referred to as a "clock transfer", but there is the problem to be considered in the digital circuit when a signal is transferred between asynchronous clocks. That is, since an asynchronous state indicates the relationship in which the change points of clocks are not fixed, the receiving side takes an unstable changing value, thereby causing a malfunction of the circuit in the worst case. This problem is well known as a "meta-stable problem". To avoid the problem, it is recommended in a digital circuit that signals are taken in series with a clock after a transfer (the operation is referred to as "latch", "tap", and etc.).

FIG. 5 shows a circuit latching three times upon a clock transfer as an example of a detailed circuit of the resynchronizing section 23. The signal obtained by x times latching the output timing reference signal (SYNCO_base) with the output reference clock (CLKO_base) is expressed by SYNCO_base_dx (x=1, 2, 3). For example, a once latched signal is SYNCO_base_d1, and a twice latched signal is SYNCO_base_d2.

The SYNCO_base is latched three times to set the active period of the output timing reference signal (SYNCO_edge) after a transfer for one cycle of the CLKO_base.

FIGS. 6A to 6G show the operation timing of each section.

The SYNCO_base shown in FIG. 6A is an output timing reference signal. The TTSCLK shown in FIG. 6B is a TIME STAMP clock. The CLKO_base shown in FIG. 6C is an output reference clock. The SYNCO_base_d1 shown in FIG. 6D, the SYNCO_base_d2 shown in FIG. 6E, and the SYNCO_base_d3 shown in FIG. 6F are signal obtained by latching the SYNCO_base once, twice, and three times respectively. The SYNCO_edge shown in FIG. 6G indicates an output timing reference signal obtained by transferring the SYNCO_base in synchronization with the CLKO_base.

The SYNCO_base_d3 shown in FIG. 6F is used by the output start timing detecting section 22 as an SYNCO_fin (signal indicating the completion of a clock transfer) described above. The SYNCO_edge shown in FIG. 6G is used by the measuring section 24 as a DIVCNT1_rst (reset signal of a first counter 241) described later.

Fourth, the measuring section 24 of the system decoder 200 shown in FIG. 2 is described below.

Figure 7:
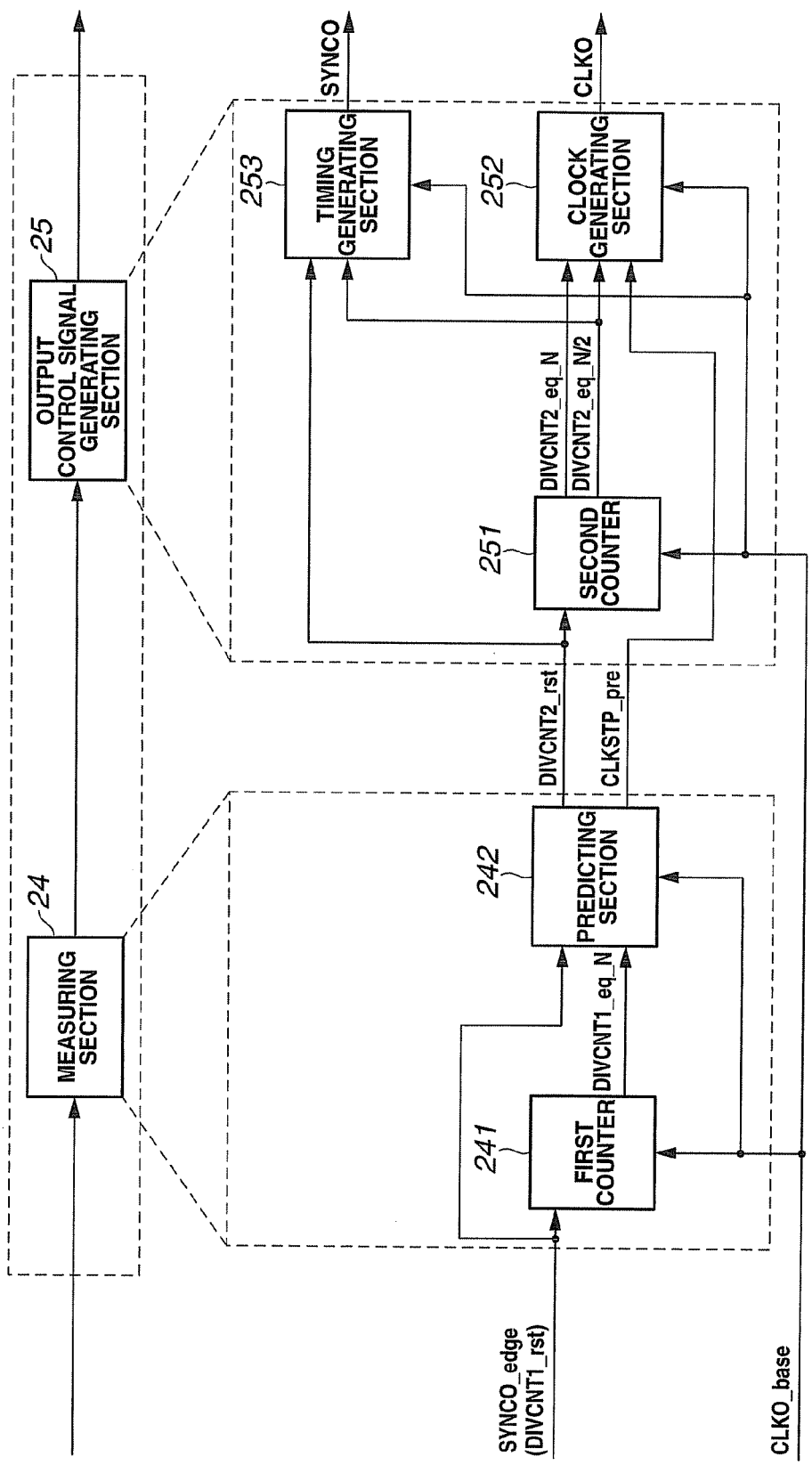
FIG. 7 is a detailed block diagram of the measuring section and the output control signal generating section.

FIG. 7 is a detailed block diagram of the measuring section 24, and the explanation is given below with reference to FIG. 7.

The measuring section 24 includes a first counter 241 configured to count a frequency division ratio N and a predicting section 242 configured to predict a period in which the output transmission clock is to be paused.

In the first counter 241, a signal (SYNCO_edge) indicating the completion of a clock transfer in the resynchronizing section 23 is used as a reset signal (DIVCNT1_rst). For easy comprehension, the first counter 241 continues counting from 1 to the number of frequency division ratio, and the frequency division ratio N is 4 in the following description.

FIGS. 4G to 4K show the operation timing of each section of the measuring section 24.

The CLKO_base shown in FIG. 4G is an output reference clock. The DIVCNT1_rst shown in FIG. 4H is a reset signal of the first counter 241. The DIVCNT1 shown in FIG. 4I is a count value of the first counter 241. The DIVCNT1_eq_N shown in FIG. 4J is a full count signal that enters an active state each time the first counter 241 counts one frequency division ratio. The CLKSTP_pre shown in FIG. 4K is a signal indicating a paused period predicted by the predicting section 242.

In FIGS. 4G to 4J, the DIVCNT1 is reset to "1" in the cycle after the DIVCNT1_rst is active in synchronization with the CLKO_base, and continues counting from 1 to 4. The DIVCNT1_eq_N becomes active each time the DIVCNT1 counts one frequency division ratio, that is, the value of the DIVCNT1 is "4".

The predicting section 242 predicts the period in which the output transmission clock is to be paused according to the full count signal (DIVCNT1_eq_N) and the reset signal (DIVCNT1_rst) of the first counter 241. From the cycle after the DIVCNT1_rst is active to the cycle the DIVCNT1_eq_N is active next in the period in which the DIVCNT1_eq_N is inactive is set as a prediction paused period, and a notice of the period is sent as a CLKSTP_pre.

In FIGS. 4H to 4K, the CLKSTP_pre becomes active in the next cycle after the DIVCNT1_rst becomes active, and inactive in the cycle where the DIVCNT1_eq_N is active next.

The predicting section 242 is described below in more detail.

Figure 8:
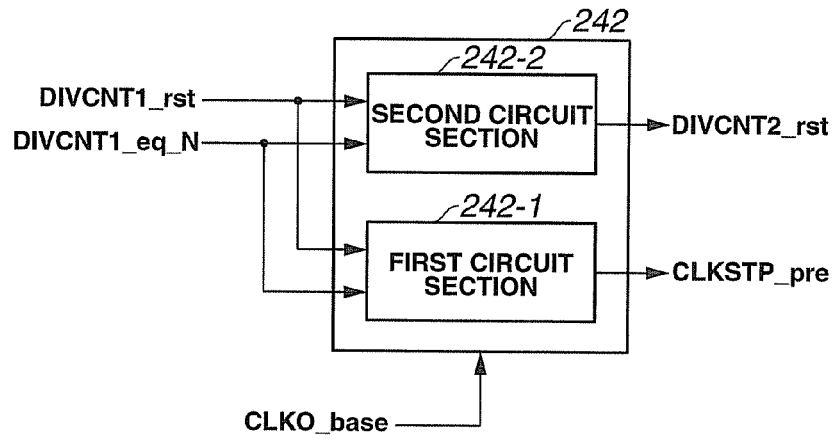
FIG. 8 is a block diagram showing the configuration of the predicting section shown in FIG. 7.

As shown in FIG. 8, the predicting section 242 includes a first circuit section 242-1 configured to generate a signal (CLKSTP_pre) indicating the prediction paused period, and a second circuit section 242-2 configured to generate a reset signal (DIVCNT1_rst) of a second counter 251.

Figure 9:
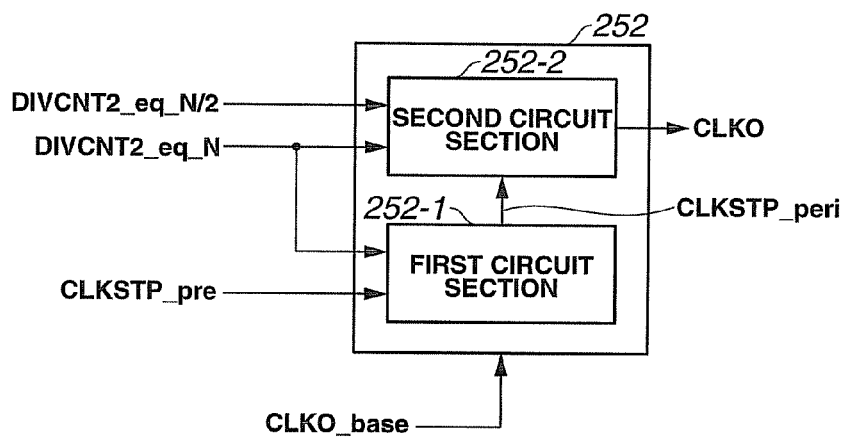
FIG. 9 is a block diagram showing the configuration of the clock generating section shown in FIG. 7.

A clock generating section 252 shown in FIG. 9 is described later.

Figure 10:
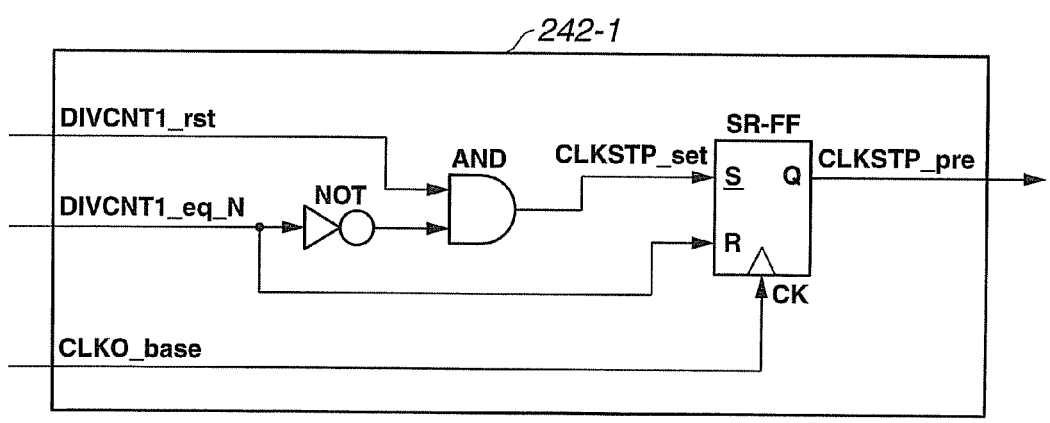
FIG. 10 is a schematic circuit diagram showing an example of a circuit of the first circuit section of the predicting section.

FIG. 10 shows an example of a detailed circuit of the first circuit section 242-1 shown in FIG. 8 of the predicting section 242. The first circuit section 242-1 includes a logical product circuit (AND), an inverting circuit (NOT), and a set-reset flip-flop (hereinafter referred to as an SR-FF) operating in synchronization with the CLKO_base.

The CLKSTP_set is a signal indicating the start timing of a prediction paused period, and can be realized by a logical product of the DIVCNT1_rst and the inverted DIVCNT1_eq_N. Using the CLKSTP_set as a set signal (signal to be input to the S terminal) of the SR-FF, and using the DIVCNT1_eq_N as a reset signal (signal to be input to the R terminal), the output of the SR-FF (signal to be output from the Q terminal) can be a CLKSTP_pre.

FIGS. 11A through 11F show examples of the operation timing of each section shown in FIG. 10 when the prediction paused period is set. FIGS. 12A to 12E show examples of the operation timing of each section shown in FIG. 10 when the prediction paused period is not set.

In FIGS. 11A to 11F and 12A to 12E, the same signal is assigned the same alphabetical character from A to F. The CLKO_base shown in FIGS. 11A and 12A is an output reference clock. The DIVCNT1_rst shown in FIGS. 11B and 12B is a reset signal of the first counter 241. The DIVCNT1 shown in FIGS. 11C and 12C is a count value of the first counter 241. The DIVCNT1_eq_N shown in FIGS. 11D and 12D is a full count signal that becomes active each time the first counter 241 counts one frequency division ratio. The CLKSTP_set shown in FIGS. 11E and 12E is a signal indicating the start timing of the prediction paused period. The CLKSTP_pre shown in FIGS. 11F and 12F is a signal indicating the prediction paused period.

As shown in FIGS. 11A to 11F, when the prediction paused period is set, and when the DIVCNT1 indicates the value (1 to 3 in the present embodiment) other than the value (4 in the present embodiment) of a full count, the DIVCNT1_rst of the reset signal becomes active, and the CLKSTP_set is detected. As a result, the CLKSTP_pre is generated as a waveform shown in FIG. 11F (an active period is set).

As shown in FIGS. 12A to 12F, when there is no prediction paused period set, no CLKSTP_set is detected. As a result, as the waveform shown in FIG. 12F, no CLKSTP_pre is generated (no active period is set).

If the signal of the S terminal is active to the operation edge (in FIGS. 11A to 11F and 12A to 12F, the operation edge is a rising edge, which holds true in the following figures) of the clock input to the CK terminal, then the output signal value of the Q terminal is set as a high (or 1) level. If the signal of the R terminal is active to the operation edge of a clock, then the output signal value from the Q terminal is set as a low (or 0) level. If the signals of both S and R terminals are inactive, then the SR-FF holds the output signal value as a type or register. If the signals of the S terminal and the R terminal are simultaneously active, then it is assumed that the S terminal is prioritized unless otherwise designated. In FIG. 10, the terminal name is marked with the under bar "_" to clearly indicate the terminal with a higher priority, which holds true in the subsequent figures.

FIG. 13 shows an example of the circuit of the second circuit section 242-2 of the predicting section 242. The second circuit section 242-2 is provided with an SR-FF operating in synchronization with the CLKO_base, and a logical product circuit (AND).

To start counting by the first counter 241 from 1 again in the next cycle after the DIVCNT1_rst as a reset signal becomes active, the cycle in which the DIVCNT1_eq_N next becomes active after the DIVCNT1_rst becomes active is delayed by the time corresponding to one frequency division ratio from the cycle in which the DIVCNT1_rst becomes active. Then, using the DIVCNT1_rst as a set signal of the SR-FF and the DIVCNT1_eq_N as a reset signal, a signal indicating the period in which an active cycle of the DIVCNT1_eq_N equivalent, in phase, to the signal delayed by one frequency division ratio of the DIVCNT1_rst can be generated as an output signal (DIVCNT1_rst_exp) of the SR-FF. By obtaining a logical product of the DIVCNT1_rst_exp and the DIVCNT1_eq_N, an operation equivalent to delaying the DIVCNT1_rst by one frequency division ratio N (N cycles) is realized. That is, the output of the logical product circuit is the reset signal (DIVCNT2_rst) of the second counter 251 of the output control signal generating section 25 described later.

FIGS. 14A to 14F show examples of the operation timing of each section shown in FIG. 13 when the clock paused period is set. FIGS. 15A to 15F show examples of the operation timing of each section shown in FIG. 13 when the clock paused period is not set.

FIGS. 14A to 14F and 15A to 15F, the same signal is assigned with the same alphabetical character from A to F. The CLKO_base shown in FIGS. 14A and 15A is an output reference clock. The DIVCNT1_rst shown in FIGS. 14B and 15B is a reset signal of the first counter 241. The DIVCNT1 shown in FIGS. 14C and 15C is a count value of the first counter 241. The DIVCNT1_eq_N shown in FIGS. 14D and 15D is a full count signal that becomes active each time the first counter 241 counts one frequency division ratio. The DIVCNT1_rst exp shown in FIGS. 14E and 15E is an output signal of the SR-FF. The DIVCNT2_rst shown in FIGS. 14F and 15F is output of the second circuit section 242-2, and a reset signal of the second counter 251 of the output control signal generating section 25.

As shown in FIGS. 14A to 14F and 15A to 15F, a DIVCNT2_rst is generated as a signal obtained by delaying the DIVCNT1_rst by N cycles (in the present embodiment, since the frequency division ratio N is 4, the figures show a 4-cycle delay) according to the CLKO_base regardless of the setting of the prediction paused period.

If the clock paused period is not set, the cycle in which the DIVCNT1_rst is active is in phase with the cycle in which the DIVCNT1_eq_N is active as shown in FIGS. 15A to 15F.

Fifth, the output control signal generating section 25 of the system decoder 200 shown in FIG. 2 is described below.

FIG. 7 is a detailed block diagram of the output control signal generating section 25, and the following description is given with reference to FIG. 7.

The output control signal generating section 25 includes: a second counter 251 configured to count the frequency division ratio N at one frequency division ratio behind the first counter 241; a clock generating section 252 configured to determine the paused period of an output transmission clock (CLKO), and pause the generation of an output transmission clock in the period; and a timing generating section 253 configured to delay output start timing by a determined clock paused period, and generate a final output timing signal (SYNCO).

FIGS. 4L to 4R show the operation timing of each section of the output control signal generating section 25.

The DIVCNT2_rst shown in FIG. 4L indicates a reset signal of the second counter 251 output from the predicting section 242 as described above. The DIVCNT2 shown in FIG. 4M indicates a count value of the second counter 251. The CLKSTP_peri shown in FIG. 4N is a signal indicating the clock paused period. The DIVCNT2_eq_N shown in FIG. 4O is a full count signal that becomes active each time the second counter 251 counts one frequency division ratio. The DIVCNT2_eq_N/2 shown in FIG. 4P is a half count signal that becomes active each time the second counter 251 counts one frequency division ratio. The CLKO shown in FIG. 4Q is an N-frequency division clock of the CLKO_base, and the period shown by the CLKSTP_peri indicates the output transmission clock paused by suppressing the toggling operation (of alternately changing a signal level between the high and low states in accordance with a certain rule of a clock). The SYNCO shown in FIG. 4R indicates a final output timing signal obtained by delaying the output timing by a period in which the CLKO is paused.

It is necessary for the second counter 251 to continue counting after the time difference of one frequency division ratio to the first counter 241. To attain this, the DIVCNT2_rst obtained by delaying the DIVCNT1_rst of the reset signal of the first counter 241 by N cycles by the CLKO_base corresponding to one frequency division ratio can be used as a reset signal of the second counter 251. In the example of the present embodiment, since the frequency division ratio is 4, the DIVCNT2_rst is a signal obtained by delaying the DIVCNT1_rst by 4 cycles according to the CLKO_base.

The second counter 251 makes a full count for one frequency division ratio, that is, makes a half count for one frequency division ratio for DIVCNT2_eq_N each time the counter counts from 1 to 4, that is, the DIVCNT2_eq_N/2 is active each time 1 and 2 are counted in the present embodiment. When the frequency division ratio N is not divided, the remainder is rounded up or down. For example, if the frequency division ratio N is 5, the half count value may be set to 2 or 3. If the N is 9, the value may be set to 4 or 5.

The clock generating section 252 generates an N frequency division clock (CLKO) of the CLKO_base using the CLKSTP_pre as an output signal from the measuring section 24, the DIVCNT1_eq_N and DIVCNT2_eq_N/2 as the output signals from the second counter 251, determines a clock paused period, and pauses the frequency dividing operation in the period. (the CLKO toggling operation is not performed in an active cycle indicated by "EG" of the DIVCNT1_eq_N or DIVCNT2_eq_N/2).

The clock generating section 252 is further described in detail.

As shown in FIG. 9, the clock generating section 252 includes a first circuit section 252-1 configured to determine a clock paused period and a second circuit section 252-2 configured to generate the output transmission clock (CLKO) as a frequency division clock of the CLKO_base.

FIG. 16 shows an example of a circuit of the first circuit section 252-1 of the clock generating section 252.

The first circuit section 252-1 includes an SR-FF operating in synchronization with the CLKO_base and two logical product circuits (AND).

Since the CLKSTP2_set of the indicating the start timing of the second prediction paused period is equivalent to the DIVCNT2_eq_N generated in the period expressed by the CLKSTP_pre of the prediction paused period signal output from the measuring section 24, the signal can be realized by a logical product. Using the CLKSTP2_set as a set signal of the SR-FF, and the full count signal DIVCNT2_eq_N of the second counter 251 as a reset signal, the output of the SR-FF is CLKSTP2_pre of the second prediction paused period signal. The (active) period indicated by both CLKSTP2_pre and CLKSTP_pre is a clock paused period, and the CLKSTP_peri as the signal indicating the period can be realized by the logical product of the two signals.

FIGS. 17A to 17I show examples of the operation timing of each section shown in FIG. 16 when a clock paused period is set. FIGS. 18A to 18I show examples of the operation timing of each section shown in FIGS. 15A to 15F when a clock paused period is not set.

In FIGS. 17A to 17I and 18A to 18I, the same signal is assigned the same alphabetical character from A to I, and the CLKO_base shown in FIGS. 17A and 18A is an output reference clock. The DIVCNT2_rst shown in FIGS. 17B and 18B is a reset signal of the second counter 251. The DIVCNT2 shown in FIGS. 17C and 18C is a count value of the second counter 251. The DIVCNT2_eq_N shown in FIGS. 17D and 18D is a full count signal that becomes active each time the second counter 251 counts one frequency division ratio. The DIVCNT2_eq_N/2 shown in FIGS. 17E and 18E is a half count signal that becomes active each time the second counter 251 counts 1/2 frequency division ratio. The CLKSTP_pre shown in FIGS. 17F and 18F is a signal indicating the prediction paused period output from the measuring section 24. The CLKSTP2_set shown in FIGS. 17G and 18G is a signal indicating the start timing of the second prediction paused period. The CLKSTP2_pre shown in FIGS. 17H and 18H is a signal indicating the second prediction paused period. The CLKSTP_peri shown in FIGS. 17I and 18I is a signal indicating the determined clock paused period.

As shown in FIGS. 17A to 17I, when a clock paused period is set, the period in which the CLKSTP_pre and the CLKSTP2_pre are both active is detected as a clock paused period. As a result, a CLKSTP_peri is generated as the waveform shown in FIG. 17I (an active period is set).

As shown in FIGS. 18A to 18I, when a clock paused period is not set, there is no period in which both CLKSTP_pre and CLKSTP2_pre are active. As a result, no CLKSTP_peri is generated as the waveform shown in FIG. 8I (an active period is not set).

Figure 19:
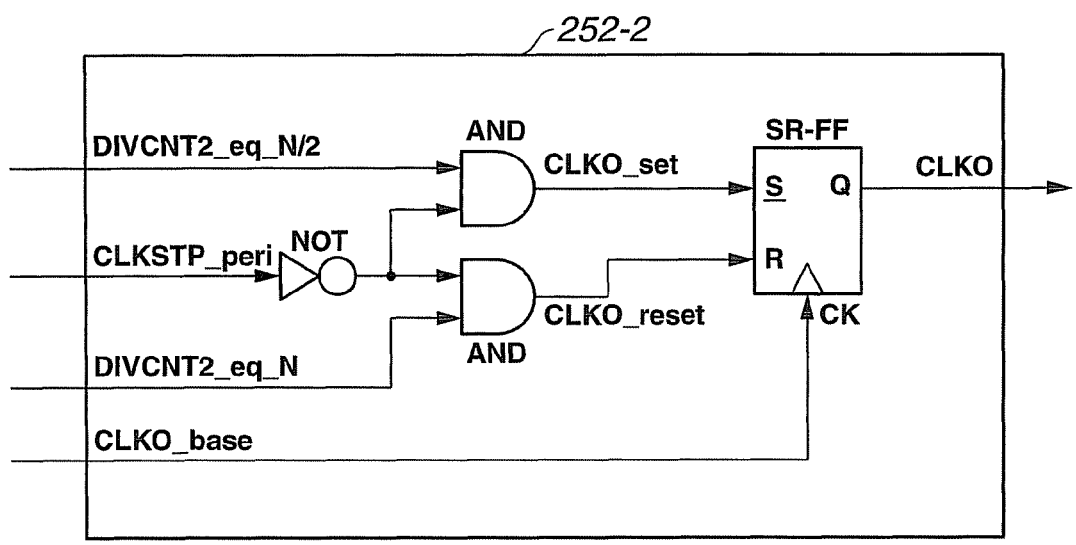
FIG. 19 is a schematic circuit diagram showing an example of a circuit of the second circuit section of the clock generating section.

FIG. 19 shows an example of the circuit of the second circuit section 252-2 of the clock generating section 252.

The second circuit section 252-2 is provided with one SR-FF operating in synchronization with the CLKO_base, two logical product circuit (AND), and one inverting circuit (NOT).

The N frequency division clock of the CLKO_base is finally output as the CLKO of the output transmission clock of a TS packet. The frequency division is performed using an SR-FF with the set signal DIVCNT2_eq_N/2 and the reset signal DIVCNT2_eq_N. A toggling operation can be performed for each N/2 cycle of the CLKO_base, thereby obtaining output of the SR-FF corresponding to the clock after the N frequency division of the CLKO_base, and realizing the generation of an N frequency division clock.

Therefore, pausing a frequency division clock is to suppress a state change of the output of the SR-FF (toggling operation of the CLKO). That is, it is necessary only to perform a masking process of preventing a set signal or a reset signal from being active in a period in which the signals are to be paused. That is, by using the CLKSTP_set masked by obtaining a logical product of the DIVCNT2_eq_N/2 and an inverted CLKSTP_peri as a set signal of the SR-FF, and the CLKO_reset masked by obtaining a logical product of the DIVCNT1_eq_N and the inverted CLKSTP_peri as a reset signal, the generation of the CLKO as a frequency division clock with which no toggling operation is performed in the period indicated by the CLKSTP_peri can be realized.

FIGS. 20A to 20I show examples of the operation timing of the signal of each section shown in FIG. 19 when a clock paused period is set. FIGS. 21A to 21I show examples of the operation timing of the signal of each section shown in FIG. 19 when a clock paused period is not set.

In FIGS. 20A to 20I and 21A to 21I, the same signal is assigned with the same alphabetical character from A to I. The CLKO_base shown in FIGS. 20A and 21A is an output reference clock. The DIVCNT2_rst shown in FIGS. 20B and 21B is a reset signal of the second counter 251. The DIVCNT2 shown in FIGS. 20C and 21C is a count value of the second counter 251. The DIVCNT2_eq_N shown in FIGS. 20D and 21D is a full count signal that becomes active each time the second counter 251 counts one frequency division ratio. The DIVCNT2_eq_N/2 shown in FIGS. 20E and 21E is a half count signal that is active each time the second counter 251 counts one frequency division ratio. The CLKSTP_peri shown in FIGS. 20F and 21F is a signal indicating the determined clock paused period. The CLKO_reset shown in FIGS. 20G and 21G is a reset signal to be input to the SR-FF in the second circuit section 252-2 shown in FIG. 19. The CLKSTP_set shown in FIGS. 20H and 21H is a set signal to be input to the SR-FF. The CLKO shown in FIGS. 20I and 21I is an N frequency division clock (in the example according to the present embodiment, since the frequency division ratio N is 4, an e-frequency division clock is used) of the CLKO_base.

As shown in FIGS. 20A to 20I, when a clock paused period is not set, there is a period in which the CLKSTP_peri is active, and the cycle (the active cycle indicated by "EG" in the figures) of the DIVCNT2_eq_N/2 that is active in the period is masked, and the CLKSTP_set is generated as shown in the waveform of the FIG. 20H. As a result, the CLKO with which no toggling operation is performed in the period as shown in the waveform of FIG. 20I is generated.

As shown in FIGS. 21A to 21I, when a clock paused period is not set, there is no period in which the CLKSTP_peri is active. As a result, the CLKO with which a toggling operation is continuously performed for each N/2 cycle of the CLKO_base as shown in the waveform of FIG. 21I is generated.

The timing generating section 253 generates output start timing in a clock paused period with the CLKO phase immediately after the paused period as the SYNCO as the final output timing signal.

FIG. 22 shows an example of the detailed circuit of the timing generating section 253.

The timing generating section 253 is provided with only one SR-FF operating in synchronization with the CLKO_base.

If the outline of the transition of the output start timing is summarized, the output start timing detected according to the TIME STAMPs as the Output Timing shown in FIG. 4D is sent as the SYNCO_base shown in FIG. 4E as an output timing reference signal. The SYNCO_base is the DIVCNT1_rst (SYNCO_edge) shown in FIG. 4H as a signal transferred in synchronization with the CLKO_base as the frequency division start base point (reset timing) of the first counter 241 in the measuring section 24, and the DIVCNT1_rst is the DIVCNT1_rst shown in FIG. 4L as a signal obtained by delaying the DIVCNT1_rst by the time of one frequency division ratio as a frequency division start base point (reset timing) of the second counter 251 in the output control signal generating section 25.

Furthermore, according to the count value of the second counter 251, the CLKO of the frequency division clock of the CLKO_base is generated, and it is necessary to output a partial TS in synchronization with the CLKO.

That is, in the present embodiment, the frequency division start base point of the second counter 251 indicated by the DIVCNT2_rst is the final output start timing of the TS packet assigned with the TIME STAMP on which the base point is based on.

Since it is necessary to allow a width of at least one frequency division ratio for a final output start timing, an output timing signal (SYNCO) having a width of one frequency division ratio can be generated as output of an SR-FF by using the reset signal (DIVCNT1_rst) of the second counter 251 as a set signal of an SR-FF, and the DIVCNT2_eq_N as a reset signal.

Thus, using the DIVCNT2_rst of the reset signal of the second counter 251 and the DIVCNT1_eq_N of the full count signal, the circuit operation equivalent to delaying the output start timing by a clock paused period is realized.

FIGS. 23A to 23G show examples of the operation timing of each section shown in FIG. 22 when a clock paused period is set. FIGS. 24A to 24G show examples of the operation timing of each section shown in FIG. 22 when a clock paused period is not set.

In FIGS. 23A to 23G and 24A to 24G, the same signal is assigned with the same alphabetical character from A to G. The CLKO_base shown in FIGS. 23A and 24A is an output reference clock. The DIVCNT2_rst shown in FIGS. 23B and 24B is a reset signal of the second counter 251. The CLKSTP_peri shown in FIGS. 23C and 24C is a signal indicating the determined clock paused period. The DIVCNT2_eq_N shown in FIGS. 23D and 24D is a full count signal that becomes active each time the second counter 251 counts one frequency division ratio. The DIVCNT2_eq_N/2 shown in FIGS. 23E and 23E is a half count signal that becomes active each time the second counter 251 counts 1/2 frequency division ratio. The CLKO shown in FIGS. 23F and 24F is an N frequency division clock of the CLKO_base (since the frequency division ratio N is 4 in this embodiment, a 4 frequency division clock is used). The SYNCO shown in Figs. G is a signal indicating a final output start timing.

As shown in FIGS. 23A to 23G, when a clock paused period is set, the CLKSTP_peri is active in the period, and the end timing of the period is an output start timing of a TS packet. As a result, the SYNCO is generated as the waveform shown in FIG. 23G. In the present embodiment, the cycle period in which the SYNCO is active is one frequency division ratio (four cycles with the CLKO_base).

As shown in FIGS. 24A to 24G, when a clock paused period is not set, there is no period in which the CLKSTP_peri is active. As a result, the SYNCO is generated without delay in the clock paused period as shown in the waveform of FIG. 24G.

Thus, the output transmission clock (CLKO) and the output timing signal (SYNCO) are generated from the output control signal generating section 25 with the phase shown in FIGS. 4Q and 4R.

Sixth, the packet outputting section 26 of the system decoder 200 shown in FIG. 2 is described below.

The packet outputting section 26 outputs the DATAO as packet data to be received from the packet inputting section 21 in synchronization with the SYNCO and CLKO to be output from the output control signal generating section 25.

Although omitted in the attached drawings, the VALIDO as a packet valid signal of the DATAO can also be output from the packet outputting section 26, and the present invention includes the application.

As described above, a circuit configured to simply suppress a PCR jitter can be realized as a synchronous circuit of one output reference clock (CLKO_base) by using two frequency division counters (first counter 241 and second counter 251).

In FIGS. 4A to 4R, since a phase is designed such that a packet can be correctly received at the rising of the CLKO in the latter block of the system decoder 200 (network interface 8 in FIG. 1), the value of the CLKO in the clock paused period is set at a low level such that the rising point of the CLKO falls substantially the center of a change point of an output signal (SYNCO, VALIDO, DATAO). However, the present invention is not limited to the phase.

FIGS. 25A to 25R show examples of the phases between an output timing signal (SYNCO) and an output transmission clock (CLKO) different from those shown in FIGS. 4A to 4R.

In FIGS. 4A to 4R and 25A to 25R, the same signal is assigned the same alphabetical character from A to R.

The examples shown in FIGS. 25A to 25R show the case in which the clock generating section 252 shown in FIG. 7 uses as is the CLKSTP_pre as an output signal from the predicting section 242 as the CLKSTP_peri of a clock paused period signal. By using the signal as is, the cycle ("EG-a" shown in the figure) in which the DIVCNT2_eq_N is active in the period indicated by the signal and the cycle ("EG-b" in the figure) in which the DIVCNT2_eq_N/2 is active are masked by the clock generating section 252. In this example, the first circuit section 252-1 shown in the detailed block diagram of the clock generating section 252 shown in FIG. 9 is omitted, but can be read as an equivalent circuit in which the CLKSTP_peri is connected to the CLKSTP_pre.

The CLKO(a) shown in FIG. 25Q' is an example of setting the value of the CLKO in a clock paused period at a high level by setting the clock at a high level when the DIVCNT2_eq_N is active, and at a low level when the DIVCNT2_eq_N/2 is active.

The CLKO(b) shown in FIG. 25Q" is an example of setting the phase in which a packet can be correctly received at the rising of the CLKO in the latter block of the system decoder 200 with the inverted waveform of the CLKO(a) by setting the clock at a low level when the DIVCNT2_e_N is active, and at a high level when the DIVCNT2_eq_N/2 is active.

FIGS. 5, 10, 13, 16, 19, and 22 show practical examples of realizing a circuit, but the example of the circuit is not the only circuit for realizing the present invention, but can be realized in various embodiments, and the present invention includes all of the various embodiments.

In the first embodiment of the present invention, the PCR jitter in a unit smaller than a packet can be suppressed using small and simple components of the circuit without using large and expensive parts.

Second Embodiment

Figure 26:
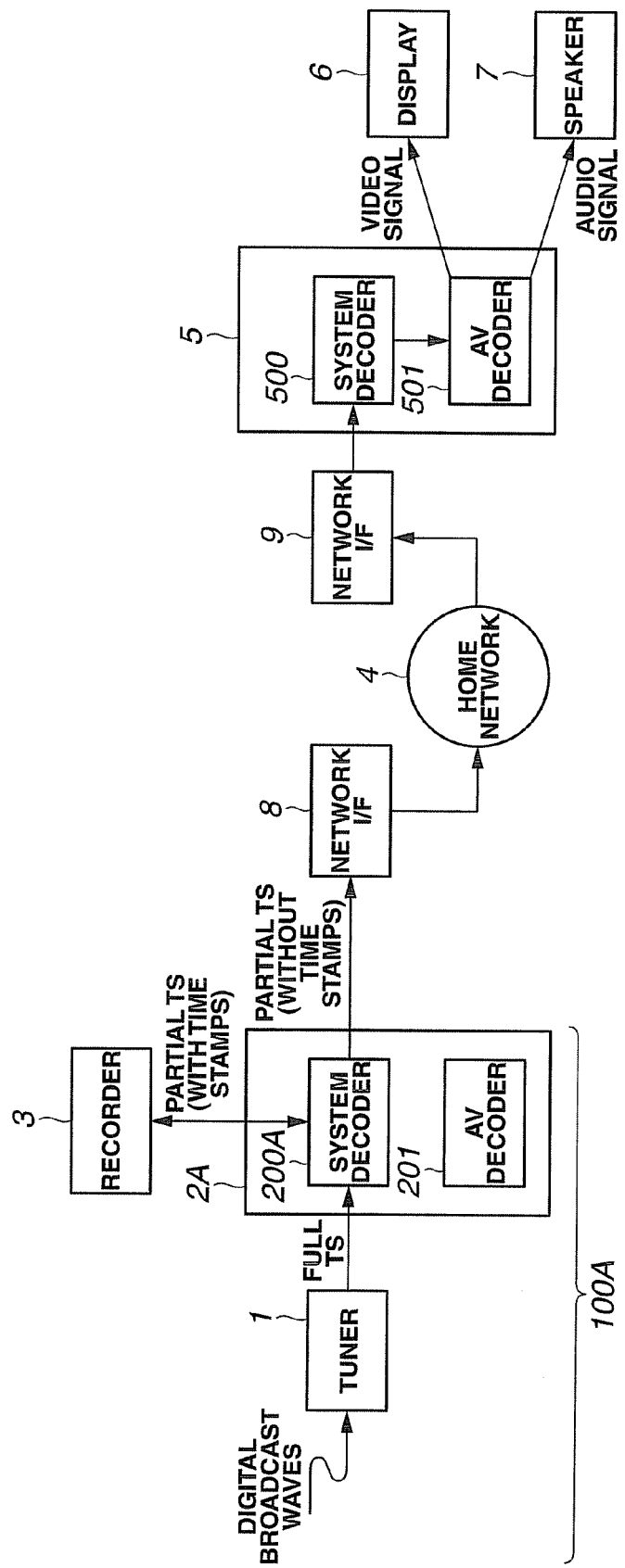
FIG. 26 is a block diagram of the home server system including the transmission device according to the second embodiment to which the present invention is applied.
Figure 27:
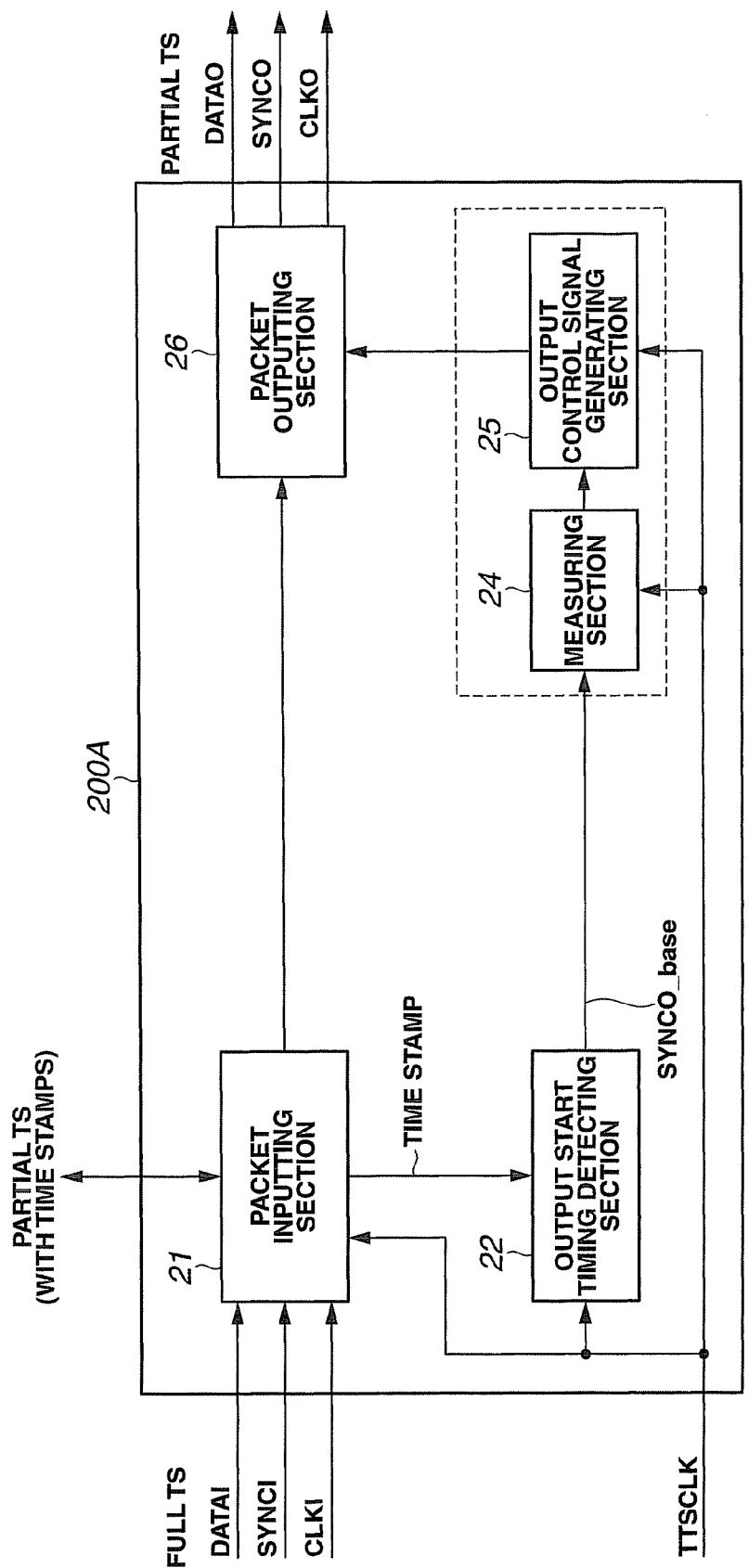
FIG. 27 is a block diagram of the system decoder shown in FIG. 26.

FIG. 26 is a block diagram of the home server system including the transmission device according to the second embodiment to which the present invention is applied. FIG. 27 is a block diagram of the system decoder 200A shown in FIG. 26. The same section is assigned the same reference numeral between FIGS. 1 and 2.

The transmission device 100A shown in FIG. 26 is different from the transmission device 100 shown in FIG. 1 in the first embodiment in the MPEG decoder 2A, and the system decoder 200A does not include the resynchronizing section 23 as shown in FIG. 27.

That is, it is not necessary to separately input the CLKO_base by using the TIME STAMP clock (TTSCLK) also as an output reference clock (CLKO_base), and the transmission device can be configured by the output start timing detecting section 22, the measuring section 24, and the subsequent sections as a synchronous system using the TTSCLK. As a result, it is not necessary to communicating a signal between asynchronous clocks, that is, the CLKO_base and the TTSCLK, as described above with reference to the first embodiment, thereby requiring no resynchronizing section 23 for a clock transfer.

FIGS. 28A to 28R show the operation timing of the system decoder 200A according to the second embodiment when the frequency division ratio N is 4. The timing charts correspond to FIGS. 4A to 4R according to the first embodiment. In FIGS. 4A to 4R and 28A to 28R, the same signal is assigned with the same alphabetical character from A to R.

Since the system decoder 200A has a circuit operating in synchronization with the TTSCLK, for example, the signal (Output Timing) indicated by the output start timing detected by the output start timing detecting section 22 can be an output timing reference signal (SYNCO_base) as is as shown in FIGS. 28A to 28E. By inputting the signal as a reset signal (DIVCNT1_rst) of the first counter 241 of the measuring section 24, the subsequent operation timing of the measuring section 24 is shown in FIGS. 28G to 28K. The operation timing of the output control signal generating section 25 is shown in FIGS. 28L to 28R. The output transmission clock (CLKO) and the output timing signal (SYNCO) can be generated as explained with reference to the first embodiment.

Other operations are similar to those in the first embodiment, and the explanation is omitted here.

Third Embodiment

Figure 29:
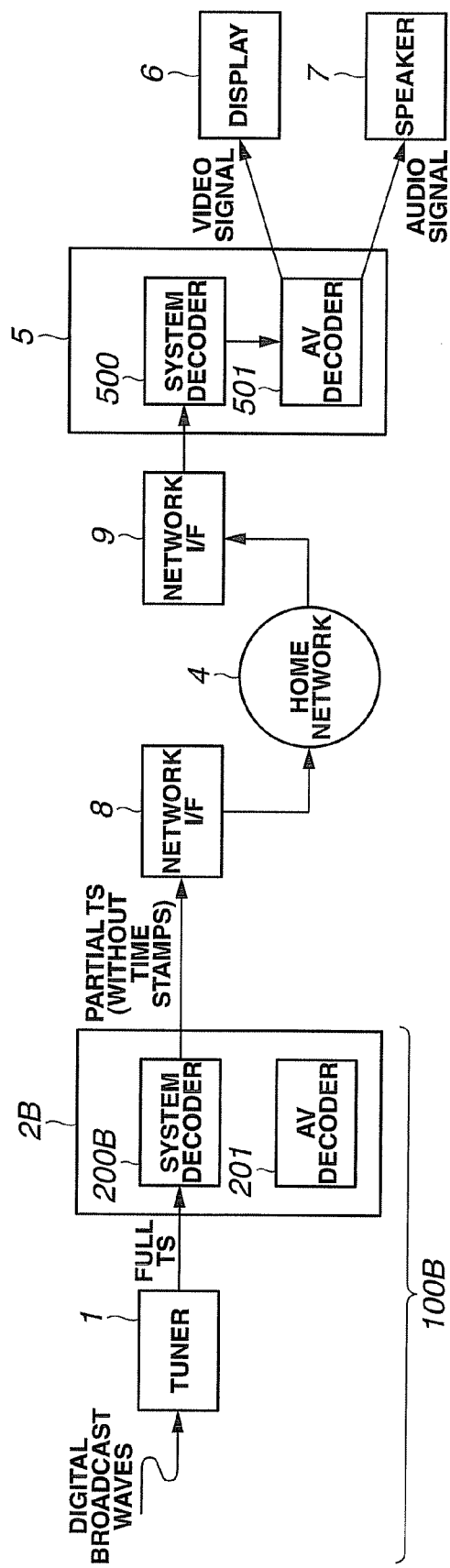
FIG. 29 is a block diagram of the home server system including the transmission device according to the third embodiment to which the present invention is applied.
Figure 30:
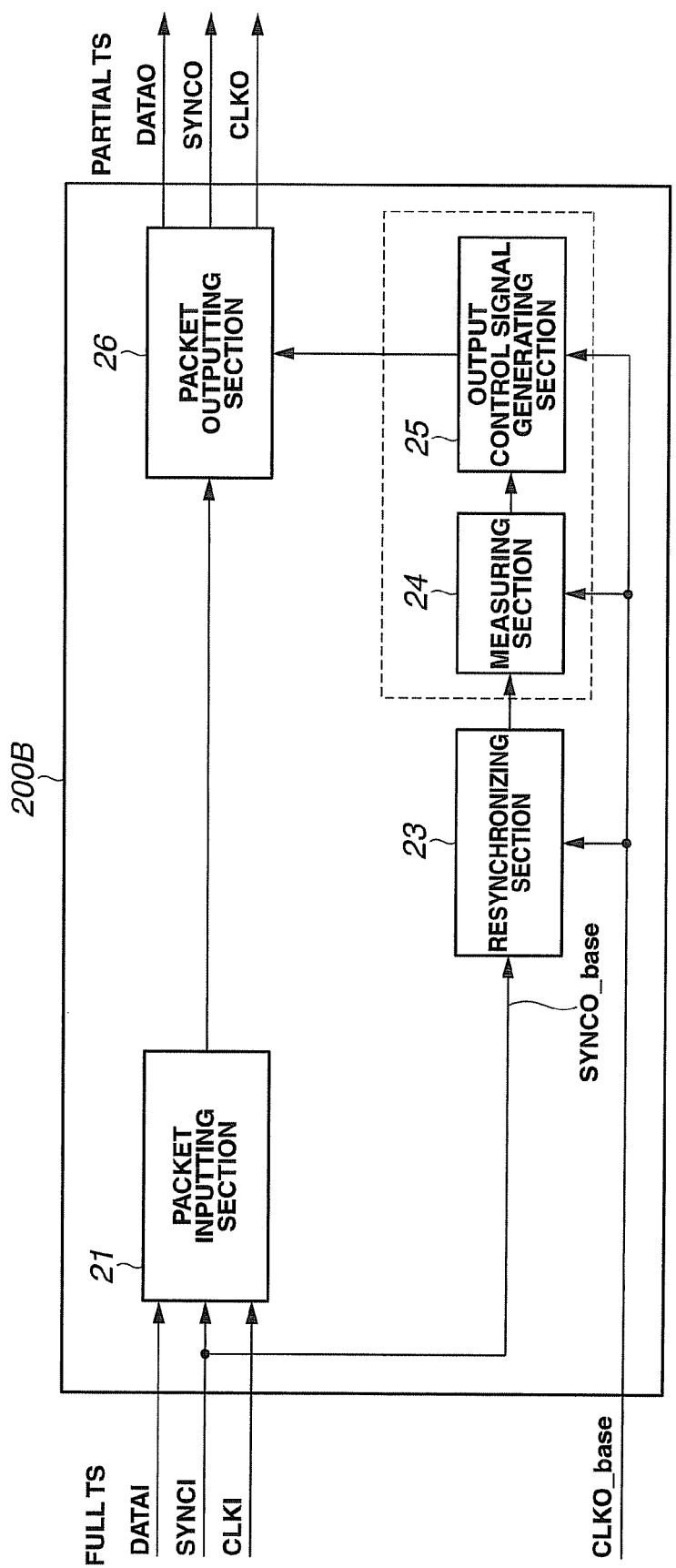
FIG. 30 is a block diagram of the system decoder shown in FIG. 29.

FIG. 29 is a block diagram of the home server system including the transmission device according to the third embodiment of the present invention. FIG. 30 is a block diagram of the system decoder 200B shown in FIG. 29. The sections in FIGS. 29 and 30 same as those in FIGS. 1 and 2 are assigned with the same reference numerals.

The first and second embodiments show examples of the distributing system corresponding to the operation referred to as a "time shift". The third embodiment shows an example of an operation of the transmission device 100B when the operation referred to a "live distribution" is considered.

A live distribution is an operation of distributing a currently broadcasting program (stream) over a network without a time difference like a time shift. In the transmission device 100B of the third embodiment, it is not necessary to set a time difference, that is, to record a stream on a recording medium temporarily on the recorder 3. Therefore, as compared with FIG. 1 of the first embodiment, the recorder 3 is omitted.

Therefore, in the system decoder 200B, it is not necessary to generate an output timing reference signal by a TIME STAMP assigned by the packet inputting section 21, and the output start timing detecting section 22 is omitted.

In the third embodiment, a packet synchronous signal (SYNC1) to be input to the packet inputting section 21 is used as an output timing reference signal (SYNCO_base) generated from the TIME STAMP in the first embodiment.

Other operations are similar to those in the first embodiment, and the explanation is omitted here.

Fourth Embodiment

Figure 31:
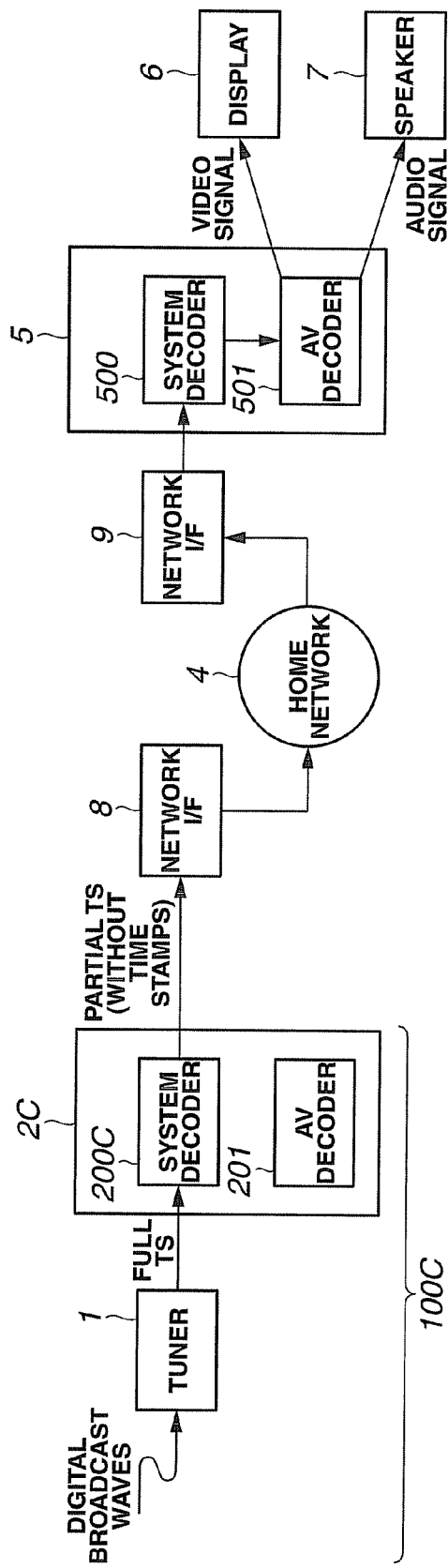
FIG. 31 is a block diagram of the home server system including the transmission device according to the fourth embodiment to which the present invention is applied.
Figure 32:
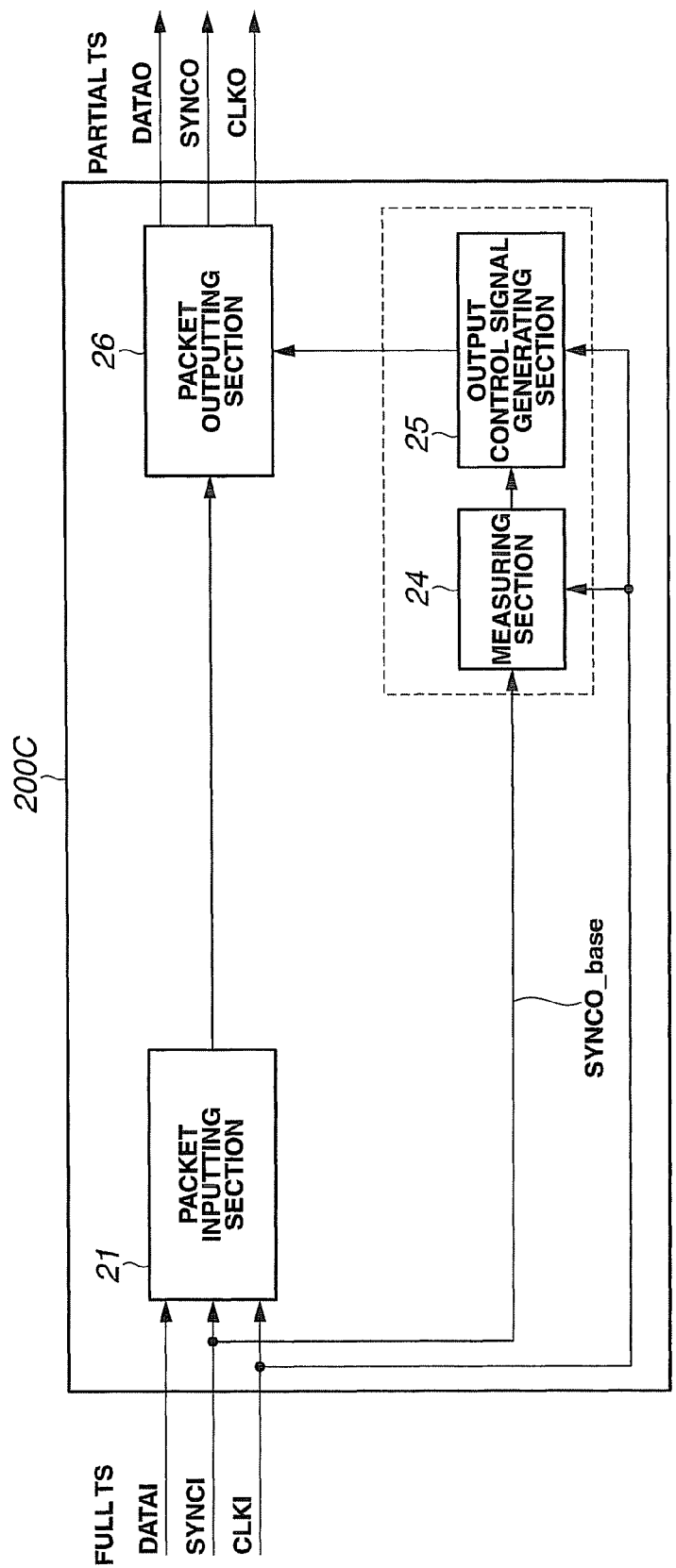
FIG. 32 is a block diagram of the system decoder shown in FIG. 31.

FIG. 31 is a block diagram of the home server system including the transmission device of the fourth embodiment of the present invention. FIG. 32 is a block diagram of the system decoder 200C shown in FIG. 31. In FIGS. 1 and 2, the same section is assigned the same reference numeral.

The fourth embodiment is similar to the third embodiment in operating the transmission device 100C when the "live distribution" is emphasized.

The difference of the transmission device 100C shown in FIG. 31 from the transmission device 100B shown in FIG. 29 is the portion of the MPEG decoder 2C. As shown in FIG. 32, the system decoder 200C does not include the resynchronizing section 23.

That is, by using the input transmission clock (CLK1) to be input to the packet inputting section 21 also as an output reference clock (CLKO_base), it is not necessary to separately input the CLKO_base, and the measuring section 24 and the subsequent sections are configured as a synchronous system in the transmission device.

However, the configuration of the fourth embodiment can be operated when a full TS is serially input and a partial TS is output in parallel, when a packet valid signal (VALID1) is periodically inactive and the transmission period of 1 TS packet is two times the 188 bytes or more in cycles in the CLK1, and when the input intervals of partialized TS packets are constant.

In the first operable case described above, since the eight frequency division of the transmission clock in the serial input corresponds to the transmission clock in the parallel transmission, any integer of 2 or more and 8 or less is selected as a frequency division ratio N.

In the second operable case described above, any integer of 2 or more and J or less is selected as a frequency division ratio N if the transmission period of 1TS packet is set with J times 188 bytes for the CLK1.

In the third operable case, if a packet to be partialized is constantly input to every M packets, any integer of 2 or more and M or less can be selected as a frequency division ratio N.

Other blocks are similar to those in the first embodiment, and the explanation is omitted here.

Fifth Embodiment

Figure 33:
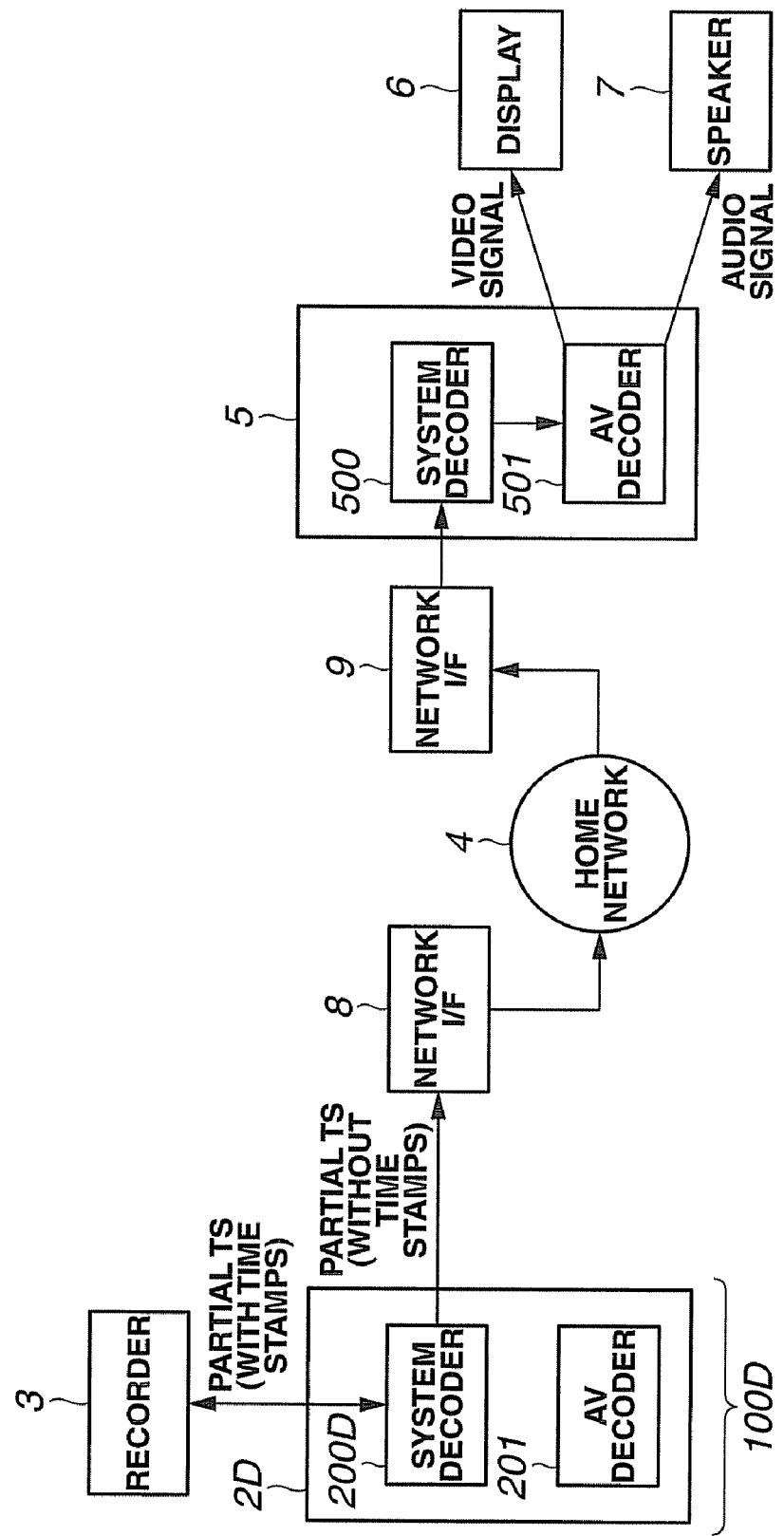
FIG. 33 is a block diagram of the home server system including the transmission device according to the fifth embodiment to which the present invention is applied.
Figure 34:
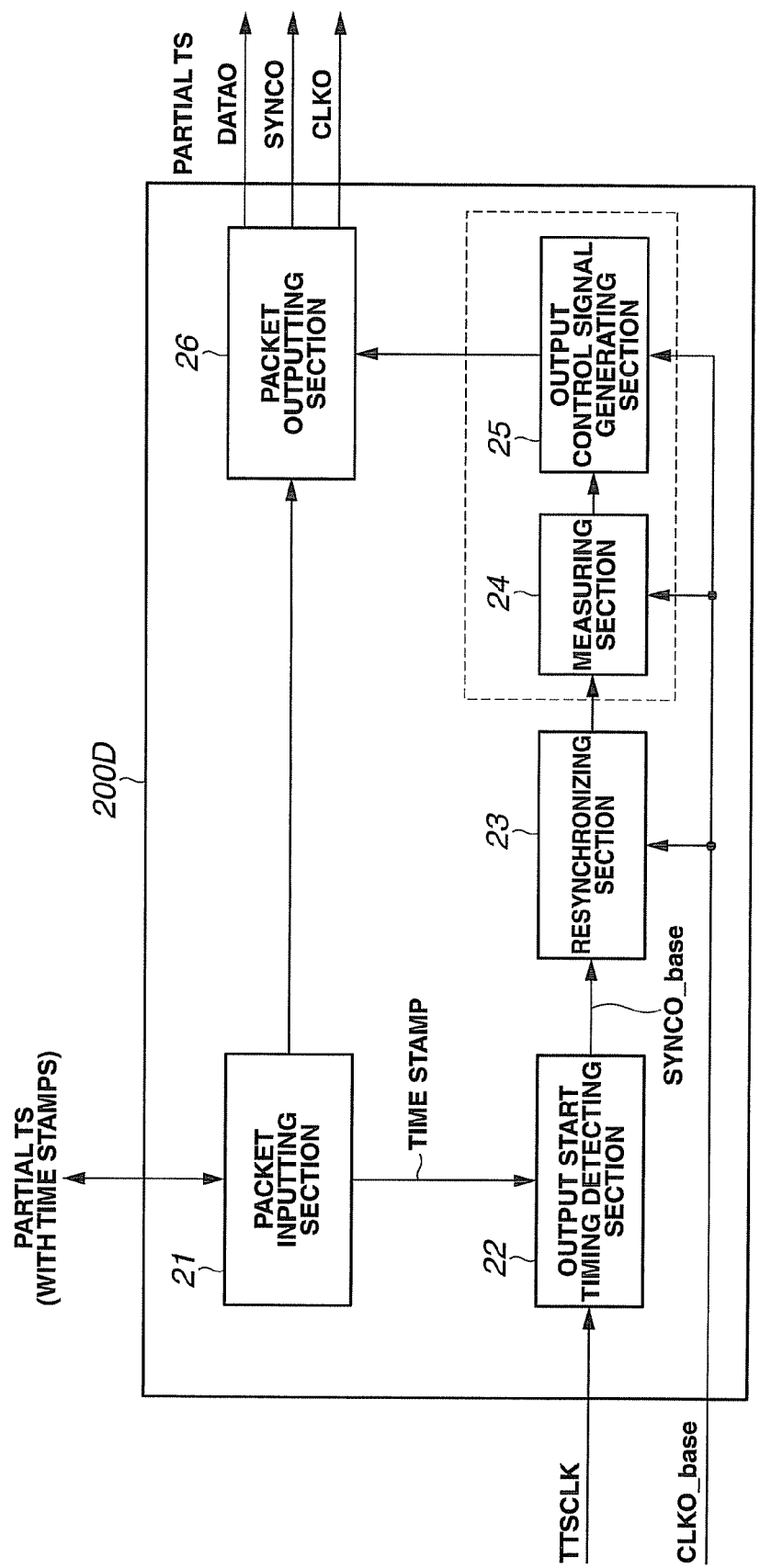
FIG. 34 is a block diagram of the system decoder shown in FIG. 33.

FIG. 33 is a block diagram of the home server system including the transmission device of the fifth embodiment of the present invention. FIG. 34 is a block diagram of the system decoder 200D shown in FIG. 33. In FIGS. 1 and 2, the same section is assigned the same reference numeral.

The third and fourth embodiments show a distribution system when the operation referred to as a "live distribution" is emphasized. The fifth embodiment shows an example of the operation of the transmission device 100D when the operation referred to as an "offline distribution" is emphasized.

An offline distribution is an operation of distributing a program (stream) recorded on a recording medium by the recorder 3 in advance over a network. The transmission device 100 according to the first embodiment can distribute data regardless of whether or not digital broadcast waves are received. In the fifth embodiment, the tuner 1 is omitted from the first embodiment by emphasizing the state in which no digital broadcast waves are received. A stream recorded on a recording medium such as a DVD etc. can be output from the recorder 3 to the MPEG decoder 2D, thereby requiring no tuner 1.

The present embodiment is different from the first embodiment in that the full TS output from the tuner 1 is not processed by the system decoder 200D. Other operations are similar to those in the first embodiment, and the explanation is omitted here.

If a system of offline distributing data in a state in which digital broadcast waves are being received, the system configuration is the same as the distributing system with a time shift according to the first embodiment. Only differences are whether the streams input from the recorder 3 to the system decoder 200D are being recorded or recorded in advance. Other blocks are similar to those according to the first embodiment, and the explanation is omitted here.

Sixth Embodiment

Figure 35:
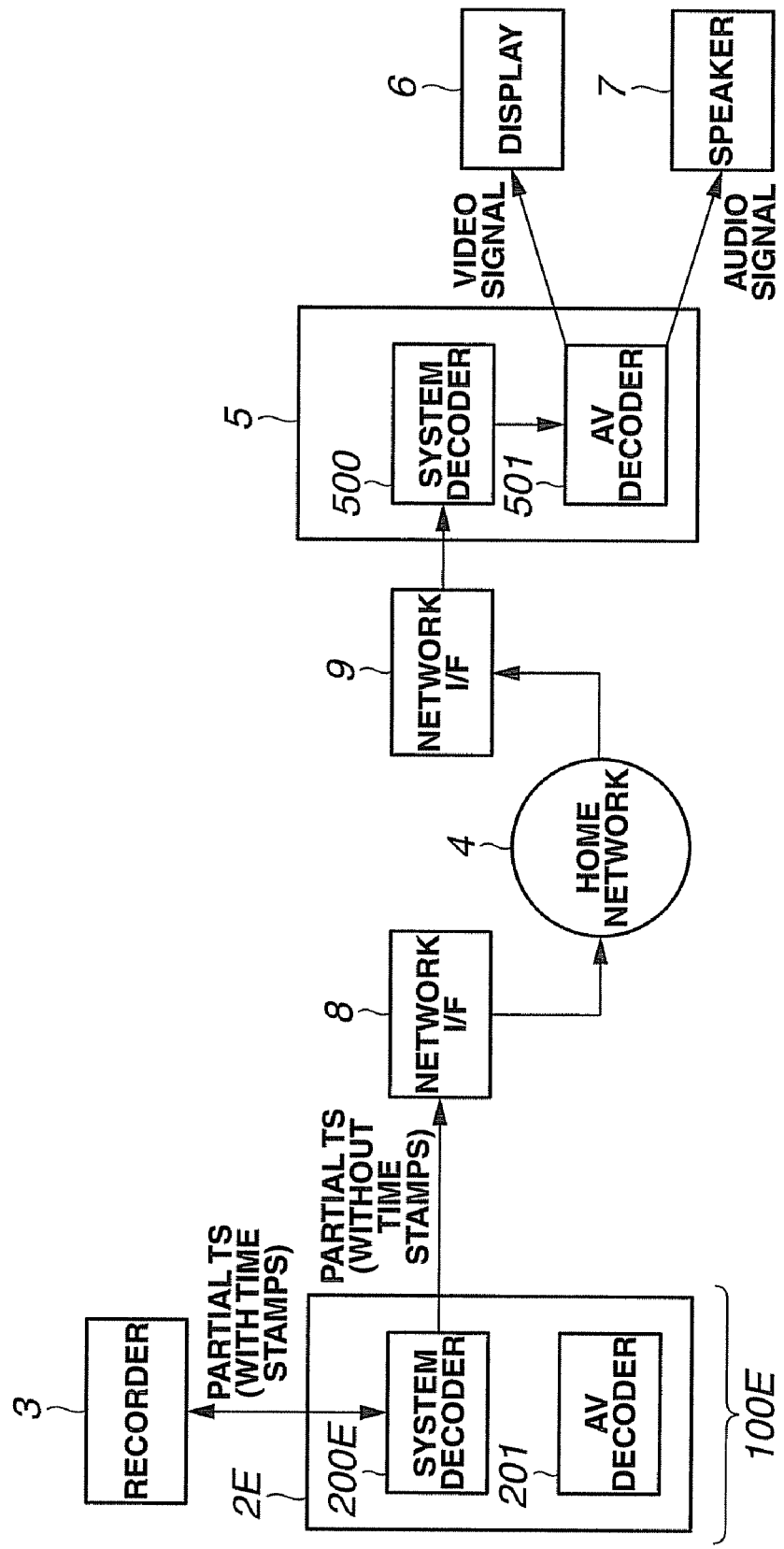
FIG. 35 is a block diagram of the home server system including the transmission device according to the sixth embodiment to which the present invention is applied.
Figure 36:
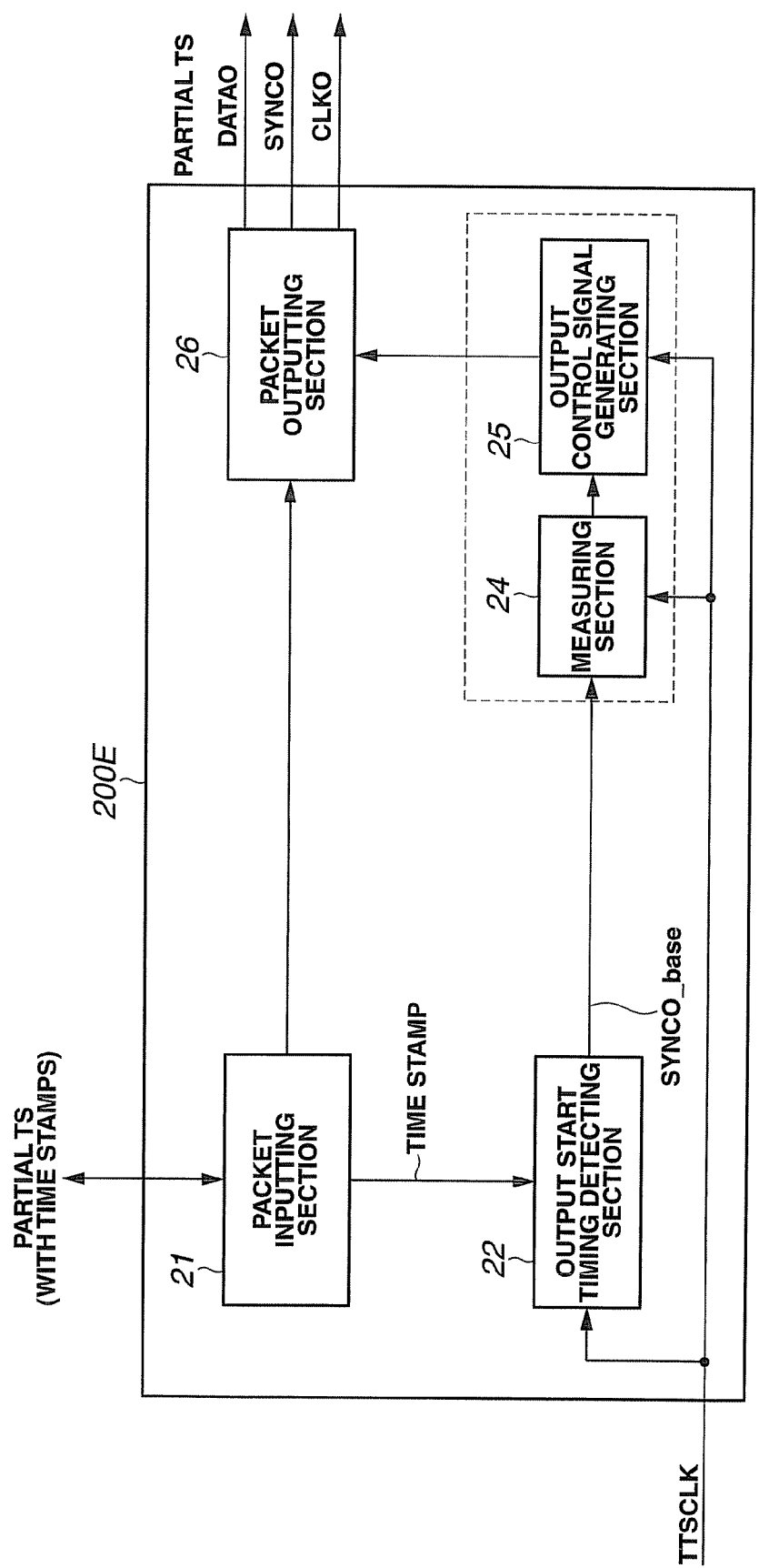
FIG. 36 is a block diagram of the system decoder shown in FIG. 35.

FIG. 35 is a block diagram of a home server system including the transmission device according to the sixth embodiment of the present invention. FIG. 36 is a block diagram of the system decoder 200E shown in FIG. 35. The sections in FIGS. 35 and 36 same as those in FIGS. 1 and 2 are assigned with the same reference numerals.

The sixth embodiment is similar to the fifth embodiment, and shows an example of operation of the transmission device 100E when the "offline distribution" is emphasized.

The transmission device 100E shown in FIG. 35 is different from the transmission device 100D shown in FIG. 33 in the MPEG decoder 2E. As shown in FIG. 36, the system decoder 200E does not include the resynchronizing section 23.

That is, by using the TIME STAMP clock (TTSCLK) to be input to the output start timing detecting section 22 also as an output reference clock (CLKO_base), it is not necessary to separately input the CLKO_base, and the transmission device is configured using the output start timing detecting section 22 and the measuring section 24 and subsequent sections as a synchronous system using the TTSCLK.

As a result, it is not necessary to communicate a signal between asynchronous system clocks described above with reference to the first embodiment, thereby requiring no resynchronizing section 23 for a clock transfer.

Other block diagrams are similar to those in the first embodiment, and the explanation is omitted here.

Seventh Embodiment

Figure 37:
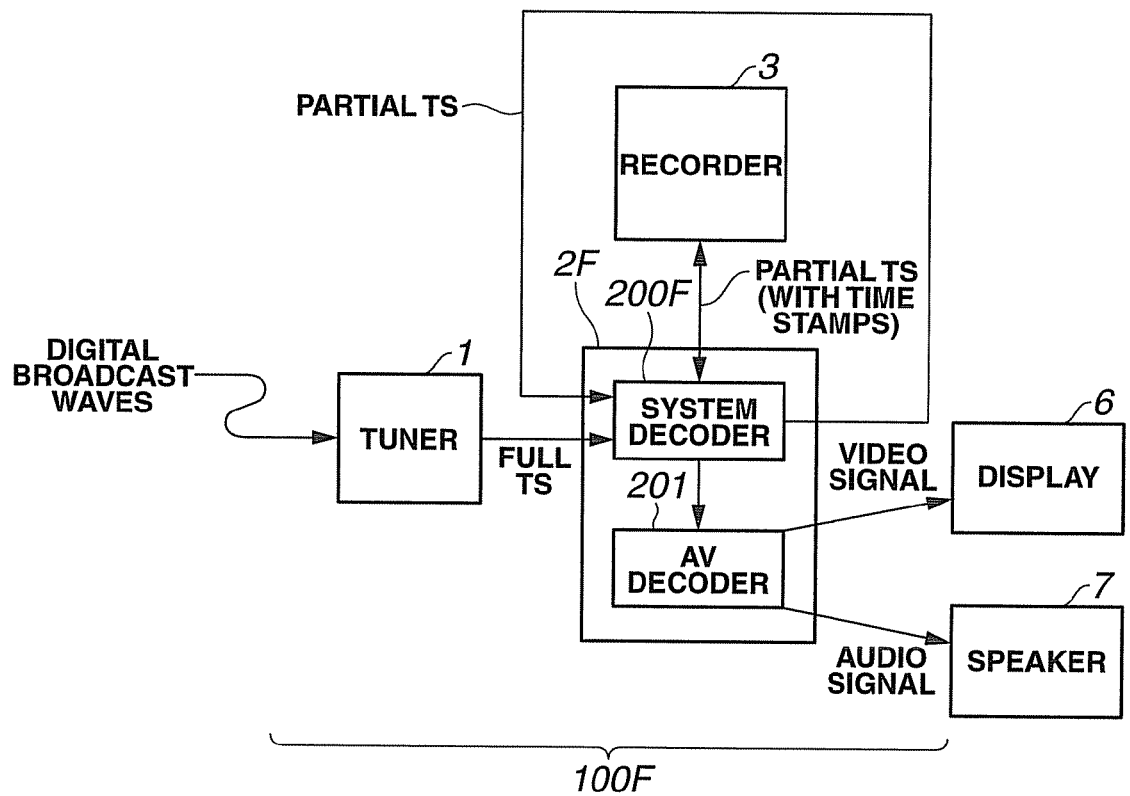
FIG. 37 is a block diagram of the receiving device including the transmission device according to the seventh embodiment to which the present invention is applied.

FIG. 37 is a block diagram showing the seventh embodiment of an example of the operation of the transmission device of the present invention for systems other than the home server system.

In the first to sixth embodiments, the configurations and examples of operations of the present invention have been described above with reference to a home server system for simulating a stream through a network.

However, in the seventh embodiment, when a home server is also used as a digital TV, a program can be taken by redistributing data to a receiving device itself. Described below is an example of the operation of the transmission device 100F by considering the above-mentioned operation.

Figure 38:
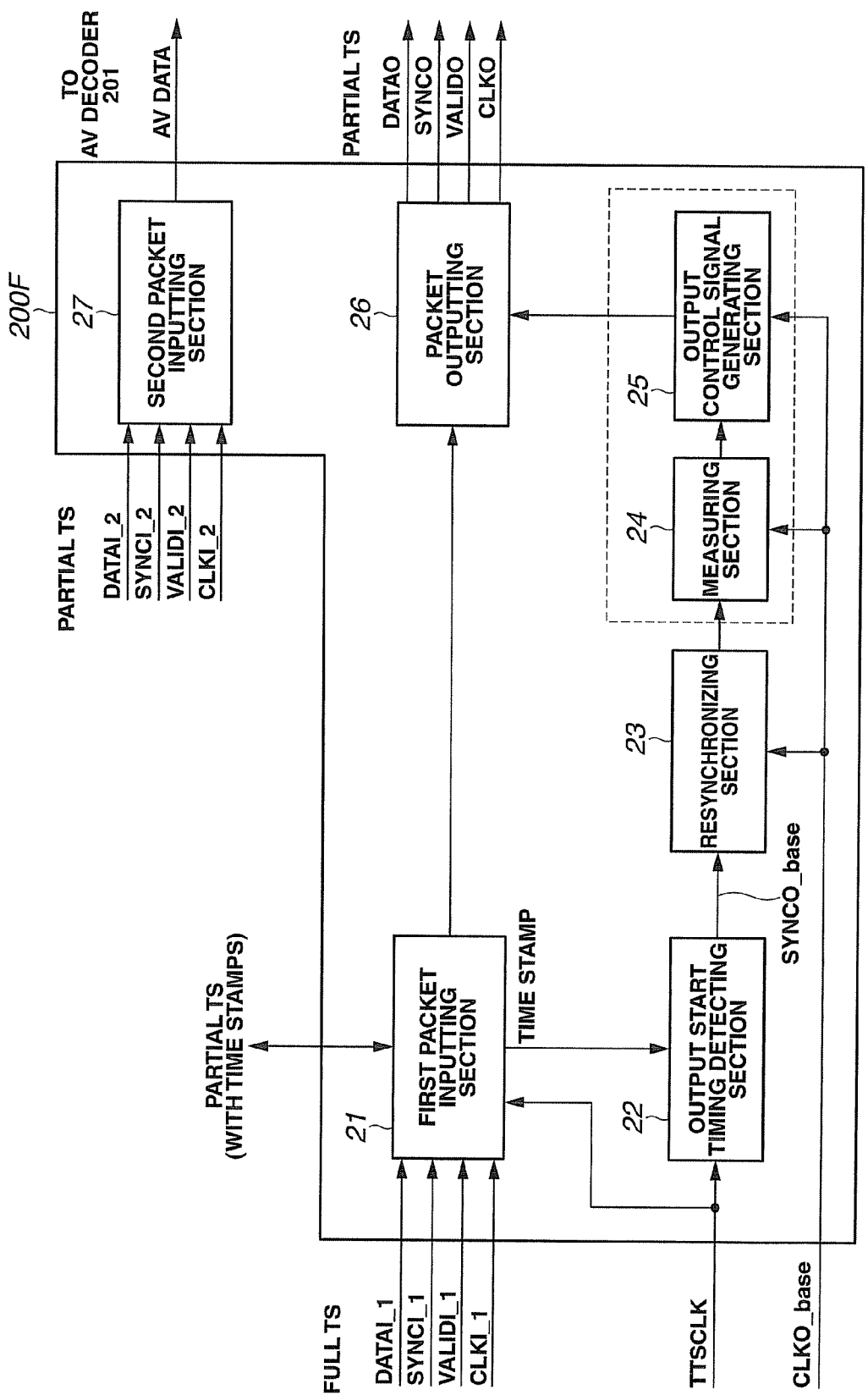
FIG. 38 is a block diagram of the system decoder shown in FIG. 37.
Figure 47A:
FIGS. 47A to 47D are explanatory views of recording and reproducing a partial TS.
Figure 47B:
Figure 47C:
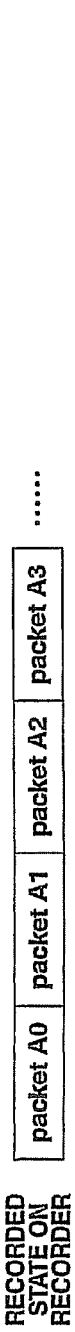
Figure 47D:
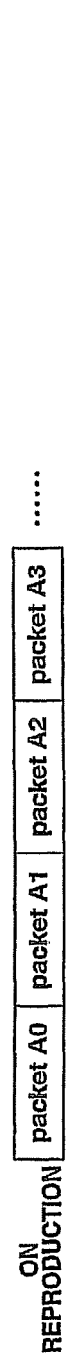

FIG. 38 shows the configuration of the system decoder 200F shown in FIG. 37.

The difference from the first to sixth embodiments is that a second packet inputting section 27 is added in addition to the packet inputting section 21 in the system decoder 200F included in the MPEG decoder 2F. For easy discrimination, the packet inputting section 21 is called the first packet inputting section 21 in FIG. 38.

The second packet inputting section 27 selects from an input stream a TS packet in which data required in the AV decoder 201 is multiplexed. All or a part of the selected TS packets are output as AV data to the AV decoder 201.

The method of communicating the AV data between the system decoder 200F and the AV decoder 201 can be performed directly as shown in the present embodiment, but the communication can be performed through a buffer reserved in the memory omitted in the attached drawings.

The function of the second packet inputting section 27 is included in the first packet inputting section 21 also omitted in the attached drawings with respect to the MPEG decoder including the AV decoder according to the first to sixth embodiments.

FIG. 38 shows an example of the system decoder capable of inputting plural streams. In the first to sixth embodiments (FIGS. 2, 27, 30, 32, 34, 36), the VALIDI and VALIDO of the packet valid signals not shown in the attached drawings are clearly shown.

As shown in FIG. 37, the partial TS output from the system decoder 200F outside the MPEG decoder 2F is not connected as an input stream of the system decoder 200F, but the output signals DATAO, SYNCO, VALIDO, and CLKO of the packet outputting section 26 can be connected to the input signals DATAI_1, SYNCI_1, VALIDI_1, and CLKI_1 of the first packet inputting section 21, or inside the MPEG decoder 2F to the input signals DATAI_2, SYNCI_2, VALIDI_2, and CLKI_2 of the second packet inputting section 27. For example, as a stream to be input to the first packet inputting section 21 or the second packet inputting section 27, the stream from the tuner 1 can be switched with the stream from the packet outputting section 26, which is included in the present invention.

Other block diagrams are similar to those in the first embodiment, and the explanation is omitted here.

As described above with reference to the first to seventh embodiments, the present invention can be applied not only to a system for distributing a stream based on the TIME STAMP, but also to a system of distributing a broadcast stream as is as a live distribution.

In the explanation of each section in the first to seventh embodiments, the circuit is operated with the rising synchronization of a clock, but the circuit can also be operated with the falling synchronization. Although the active polarity of a signal is described as a high level, but the circuit can be a low level. The present invention includes both levels.

The active period of the output timing signal (SYNCO) corresponds to one cycle of the output transmission clock (CLKO), but a circuit of two cycles or more can be used, which is included in the present invention.

The effects of the present invention are described below.

According to the present invention, a PCR jitter can be easily suppressed as much as possible without carrying a noise source on a transmission clock during redistributing.

According to the transmission device of the present invention, using the reference clock (CLKO×K) of the frequency of K times (K is a real number of 2 or more) or more of the output transmission clock (CLKO) to be externally generated as input, and by N-frequency-division of the reference clock (CLKO×K), the CLKO is generated (N is an integer of K or less). At this time, a frequency division period in which a fine-fiber-shaped pulse waveform can be generated on the CLKO is detected as shown in FIGS. 46A to 46G. In the detected frequency division period, no output transmission clock is generated (state change (toggling operation) from a high level to a low level is not allowed), thereby preventing the generation of the noise source.

In the first to seventh embodiments typically shown in FIG. 7, the configuration using two frequency division counters, that is, the first counter 241 and the second counter 251, is described. In the following descriptions, for easy explanation, two counters are equivalently replaced with one frequency division counter, and the two counters are represented by one frequency division counter for summary.

The effect of the present invention is described below using a practical example of the frequency division ratio N shown in FIGS. 39A to 39L and 40A to 40L.

The TTSCLK shown in f 39K is a TIME STAMP clock. The TTSCNT shown in FIG. 39L is a count value of a TIME STAMP counter counted by the TTSCNT. In FIGS. 39A to 39J, when the output of a TS packet is started the moment when the value of the TTSCNT reaches T(n), and the next packet is to be output the moment when the value of the TTSCNT reaches T(n+1), how the reduction effect of the PCR jitter changes depending on the difference of the frequency division ratio N is shown.

FIGS. 39A to 39D show examples when the frequency division ratio N is 4, and FIGS. 39E to 39H show examples when the frequency division ratio N is 8. The CLKO×4 shown in FIG. 39A is a reference clock when the frequency division ratio is 4, and the CLKO×8 shown in FIG. 39E is a reference clock when the frequency division ratio is 8. FIGS. 39I and 39J show the case where the output timing signal (SYNCO) and the output transmission clock (CLKO) are generated in a method similar to a conventional method.

The DIVCNT is a count value of a frequency division counter which counts a frequency division ratio. The value is initialized depending on the output start timing determined by a TIME STAMP, and the count of one frequency division ratio is repeated. For easy comprehension, the initial value of the frequency division ratio counter is "1", 1 to 4 is repeated when the 4-frequency-division is applied, and 1 to 8 is repeated when the 8-frequency-division is applied. In the present invention, the initial value of the counter is not limited to "1", but the number corresponding to the frequency division ratio N can be counted from any integer.

In this case, each time the counter counts from 1 to N, the output transmission clock (CLKO) is generated for one cycle (one period).

When the frequency division ratio is 4 as shown in FIGS. 39A to 39D, the output start timing is detected in the state in which the value of the DIVCNT immediately before the next output start timing has changed from 1 to 3 only. In the frequency division period including the time point in which the output start timing is detected, the transmission of the output transmission clock (CLKO) is paused (the output transmission clock is not changed to the high level or the low level, or no toggling operation is performed). Thus, no signal of the noise source as shown in FIGS. 46F and 46G described above with reference to the prior art is not output, and the PCR jitter can be reduced to a larger extent than the conventional method as shown in FIGS. 39I and 39J.

When the frequency division ratio is 8 as shown in FIGS. 39E to 39H, the output timing is detected in the state in which the value of the DIVCNT immediately before the next output start timing has changed from 1 to 5 only, In the frequency division period including the time point in which the output timing is detected, the transmission of the output transmission clock (CLKO) is paused. Thus, no signal of the noise source as shown in FIGS. 46A and 46B is not output as in the case of the frequency division ratio of 4, and the PCR jitter can be reduced to a larger extent than the conventional method when the frequency division ratio is 4 and as shown in FIGS. 39I and 39J.

FIGS. 40A to 40L show examples of the cases in which the phase between the frequency division start timing (time when the DIVCNT is "1") and the output start timing (time when the TTSCNT is "T(n+1)") of the next packet is different from the case shown in FIGS. 39A to 39L. Similar types of signals as those in FIGS. 39A to 39L are assigned the identical alphabetical characters from A to L. That is, the TTSCLK shown in FIG. 40K is a TIME STAMP clock, the TTSCNT shown in FIG. 40L is a count value of the TIME STAMP counter operating with the TTSCLK, and the DIVCNT shown in FIGS. 40B and 40F is a count value of the frequency division counter.

FIGS. 40A to 40D show examples when the frequency division ratio N is 2, and FIGS. 40E to 40H show examples when the frequency division ratio N is 4. The CLKO×2 shown in FIG. 40A is a reference clock when the frequency division ratio is 2, and the CLKO×4 shown in FIG. 40E is a reference clock when the frequency division ratio is 4. FIGS. 40I and 40J show the case where the output timing signal (SYNCO) and the output transmission clock (CLKO) are generated in a method similar to a conventional method.

As in the example shown in FIGS. 39A to 39L, the PCR jitter can be reduced as compared with the conventional method even when the frequency division ratio shown in FIGS. 40A to 40D is 2. When the frequency division ratio shown in FIGS. 40E to 40H is 4, the PCR jitter can be further reduced.

That is, if the reference clock (CLKO×K) having the frequency of K times (K is a real number of 2 or more) the frequency of the output transmission clock (CLKO) to be generated is input as a reference clock to be externally provided, that is, if the frequency division ratio in the present invention is N (N is an integer of 2 or more), then the PCR jitter can be suppressed by using the reference clock having N times or more frequency. Thus, by increasing the value N, the PCR jitter can be reduced to the level at which the PCR jitter can be ignored.

As a practical example of the present invention, the amount of jitter from 3 MHz per cycle is the maximum ±333 ns (one cycle at 3 MHz) for the digital broadcast in Japan where the frequency of about 3 to 7 MHz is commonly used as a parallel transmission clock, which corresponds to 66% of the tolerance ±50 ns of the MPEG2 standards.

In contrast, with a method of the invention, PCR jitter can be suppressed to on the order of 16% of the tolerance (±83 ns) by using a 12 MHz reference clock that is corresponding to 4 times of 3 MHz as a parallel transmission clock, to on the order of 8% of the same tolerance (±41 ns) by using a 24 MHz reference clock that is corresponding to 8 times, and to on the order of 4% of the same tolerance (±20 ns) by using a 48 MHz reference clock that is corresponding to 16 times, respectively. This is highly likely to avoid violation of the MPEG2 standard even when the jitter is combined with originally added jitter when the RCP is received.

In case of a stream previously recorded in a recorder, there are recording schemes with reduced image quality (bit rate of the stream) such as a so-called extended play mode. Considering a parallel transmission clock in case of a stream recorded in this mode, it is possible to have a considerably low frequency such as 0.25 MHz (which is corresponding to a bit rate of 2 M bps).

The amount of jitter given by one cycle of 0.25 MHz could be up to ±4000 ns. Using a reference clock having a frequency of 2 times or more of the output transmission clock, however, makes it possible to keep the PCR jitter within the tolerance of the MPEG2 standard.

Finally, although an application to a system decoder included in an MPEG decoder has been described as an embodiment of the present invention, applications are not limited to a system decoder because PCR jitter suppression is essential to a device for transmitting or distributing a stream (TS). For example, in a home server system represented by FIG. 1, it is apparent that the network I/F 9 is also a device for transmitting a stream inputted from the home network 4 to the MPEG decoder 5, to which the present invention can be applied.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A transmission device which selects all or a part of streams from among input streams, and transmits the selected streams as new streams, comprising:

a measuring section configured to input an output timing reference signal and an output reference clock required to output the new streams, and when a notice of output start timing is received according to the output timing reference signal, detect the timing, and predict a period in which an output transmission clock to be generated is to be paused; and an output control signal generating section configured to generate the output transmission clock by frequency-dividing by N, where N is an integer of 2 or more, the output reference clock, generate an output timing signal having a constant phase relationship with the output transmission clock, determine at least a part of the period predicted by the measuring section as a paused period, pause generating the output transmission clock during the period, adjust a phase of the output timing reference signal depending on the paused period, and output the output timing reference signal as the output timing signal.

2. The transmission device according to claim 1, further comprising a resynchronizing section configured to synchronize the output timing reference signal to the output reference clock when the output timing reference signal is asynchronous to the output reference clock.

3. A home server system comprising the transmission device according to claim 2.

4. A home server system comprising the transmission device according to claim 1.

5. A transmission device which selects all or a part of streams from among input streams, and transmits the selected streams as new streams, comprising:

a first counter configured to input an output timing reference signal and an output reference clock required to output the new streams, and continuously count a frequency division ratio N, where N is an integer of 2 or more, by the output reference clock using output start timing received as a notice according to the output timing reference signal as a starting point;

a predicting section configured to, when a notice of output start timing is received according to the output timing reference signal before the first counter completely counts a number corresponding to the frequency division ratio N, detect the timing, and predict a period in which an output transmission clock to be generated is to be paused;

a second counter configured to continuously count the frequency division ratio N by the output reference clock with a delay behind the first counter by a time corresponding to one frequency division ratio;

a clock generating section configured to generate the output transmission clock as an N frequency dividing clock of the output reference clock by toggles depending on a count value of the second counter, determine at least a part of the period predicted by the predicting section as a paused period, and pause generating the output transmission clock during the period; and a timing generating section configured to generate an output timing signal having a constant phase relationship with the output transmission clock, delay a phase of the output start timing whose notice is received according to the output timing reference signal depending on the paused period whose notice is received from the clock generating section, and output the output timing signal.

6. The transmission device according to claim 5, wherein the clock generating section generates the output transmission clock as an N frequency division clock of the output reference clock by performing a toggling operation each time the second counter counts a number corresponding to N and N/2.

7. The transmission device according to claim 6, further comprising
a resynchronizing section configured to synchronize the output timing reference signal to the output reference clock when the output timing reference signal is asynchronous to the output reference clock.

8. A home server system comprising the transmission device according to claim 7.

9. A home server system comprising the transmission device according to claim 6.

10. The transmission device according to claim 5, further comprising
a resynchronizing section configured to synchronize the output timing reference signal to the output reference clock when the output timing reference signal is asynchronous to the output reference clock.

11. A home server system comprising the transmission device according to claim 10.

12. A home server system comprising the transmission device according to claim 5.

13. A transmission device which selects all or a part of streams from among input streams, and transmits the selected streams as new streams, comprising:
a packet inputting section configured to select all or a part of packets configuring the input streams;
an output start timing detecting section configured to detect output start timing of each packet configuring the new streams using a TIME STAMP assigned to each packet of the input streams, and output the TIME STAMP as an output timing reference signal;
a measuring section configured to input the output timing reference signal and an output reference clock, and when a notice of output start timing is received according to the output timing reference signal, detect the timing, and predict a period in which an output transmission clock to be generated is to be paused;
an output control signal generating section configured to generate the output transmission clock by frequency-dividing by N, where N is an integer of 2 or more, the output reference clock, generate an output timing signal having a constant phase relationship with the output transmission clock, determine at least a part of the period predicted by the measuring section as a paused period, pause generating the output transmission clock during the period, adjust a phase of the output timing reference signal depending on the paused period, and output the signal as the output timing signal; and
a packet outputting section configured to match each packet selected by the packet inputting section with the output timing signal whose phase is adjusted, synchronize the packet to the N-frequency-divided output transmission clock, and output the packets as the new streams.

14. A home server system comprising the transmission device according to claim 13.

15. The transmission device according to claim 13, further comprising
a resynchronizing section configured to synchronize the output timing reference signal to the output reference clock when the output timing reference signal is asynchronous to the output reference clock.

16. A home server system comprising the transmission device according to claim 15.

17. The transmission device according to claim 15, further comprising:
an AV decoder configured to decode AV data; and
a second packet inputting section configured to select a packet from the input stream, and provide all or a part of the selected packets as the AV data, wherein
a stream output from the packet outputting section is redistributed to the second packet inputting section.

18. The transmission device according to claim 13, wherein
a TIME STAMP clock is used as the output reference clock.

19. The transmission device according to claim 18, further comprising:
an AV decoder configured to decode AV data; and
a second packet inputting section configured to select a packet from the input stream, and provide all or a part of the selected packets as the AV data, wherein
a stream output from the packet outputting section is redistributed to the second packet inputting section.

20. A home server system comprising the transmission device according to claim 18.

21. The transmission device according to claim 13, further comprising:
an AV decoder configured to decode AV data; and
a second packet inputting section configured to select a packet from the input stream, and provide all or a part of the selected packets as the AV data, wherein
a stream output from the packet outputting section is redistributed to the second packet inputting section.

* * * * *